(12) United States Patent
Alexander et al.

(10) Patent No.: US 10,199,962 B2
(45) Date of Patent: Feb. 5, 2019

(54) PLUG AND PLAY UNIVERSAL INPUT ACTUATOR

(71) Applicant: Johnson Controls Technology Company, Holland, MI (US)

(72) Inventors: Robert K. Alexander, Menomonee Falls, WI (US); Bernard P. Clement, Mequon, WI (US); Gary A. Romanowich, Slinger, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 288 days.

(21) Appl. No.: 15/065,725

(22) Filed: Mar. 9, 2016

(65) Prior Publication Data

US 2016/0308473 A1 Oct. 20, 2016

Related U.S. Application Data

(60) Provisional application No. 62/288,402, filed on Jan. 28, 2016, provisional application No. 62/135,008, filed on Mar. 18, 2015.

(51) Int. Cl.
| | | |
|---|---|---|
| *F24F 11/30* | (2018.01) | |
| *F24F 13/14* | (2006.01) | |

(Continued)

(52) U.S. Cl.
CPC ............... *H02P 4/00* (2013.01); *F24F 3/044* (2013.01); *F24F 11/83* (2018.01); *Y02B 30/767* (2013.01)

(58) Field of Classification Search
CPC .................................. F24F 11/00; G05B 17/02
See application file for complete search history.

(56) References Cited

U.S. PATENT DOCUMENTS

| | | |
|---|---|---|
| 3,624,475 A | 11/1971 | Smith |
| 4,264,297 A | 4/1981 | Van Berkum |

(Continued)

FOREIGN PATENT DOCUMENTS

| | | |
|---|---|---|
| CN | 1643523 | 7/2005 |
| CN | 101253679 | 8/2008 |

(Continued)

OTHER PUBLICATIONS

Belimo wiring Spring Return Actuator Product Range Specification sheet, p. 6, May 2010.*

(Continued)

*Primary Examiner* — Bickey Dhakal
*Assistant Examiner* — Charles S Laughlin
(74) *Attorney, Agent, or Firm* — Foley & Lardner LLP

(57) ABSTRACT

An actuator in a HVAC system includes a motor and a drive device driven by the motor. The drive device is coupled to a movable HVAC component for driving the movable HVAC component between multiple positions. The actuator includes an input connection configured to receive an input signal and a processing circuit coupled to the motor. The processing circuit is configured to determine whether the input signal is an AC voltage signal or a DC voltage signal. The processing circuit is configured to operate the motor using an AC motor control technique in response to determining that the input signal is an AC voltage signal and configured to operate the motor using a DC motor control technique in response to determining that the input signal is a DC voltage signal.

8 Claims, 15 Drawing Sheets

(51) Int. Cl.
  *F24F 11/50* (2018.01)
  *H02P 4/00* (2006.01)
  *F24F 3/044* (2006.01)
  *F24F 11/83* (2018.01)

(56) References Cited

U.S. PATENT DOCUMENTS

| | | | |
|---|---|---|---|
| 4,588,936 | A | 5/1986 | Itoh et al. |
| 4,763,347 | A | 8/1988 | Erdman |
| 5,019,757 | A | 5/1991 | Beifus |
| 5,034,871 | A | 7/1991 | Okamoto et al. |
| 5,261,025 | A | 11/1993 | Post et al. |
| 5,448,141 | A | 9/1995 | Kelley et al. |
| 5,675,231 | A | 10/1997 | Becerra et al. |
| 5,744,923 | A | 4/1998 | Strauss et al. |
| 5,744,927 | A | 4/1998 | Hayashida |
| 5,825,597 | A | 10/1998 | Young |
| 6,070,660 | A | 6/2000 | Byrnes et al. |
| 6,173,902 | B1 | 1/2001 | Bauer et al. |
| 6,442,644 | B1 | 8/2002 | Gustavson et al. |
| 6,491,094 | B2 | 12/2002 | Rayburn et al. |
| 6,495,981 | B2 | 12/2002 | Romanowich et al. |
| 6,522,093 | B1 | 2/2003 | Hsu et al. |
| 6,624,606 | B2 | 9/2003 | Kushida et al. |
| 6,647,325 | B2 | 11/2003 | Shimazaki et al. |
| 6,725,132 | B2 | 4/2004 | Frankel et al. |
| 6,786,100 | B2 | 9/2004 | Oba et al. |
| 6,820,409 | B2 | 11/2004 | Braun |
| 6,940,241 | B2 | 9/2005 | Lange et al. |
| 7,012,393 | B2 | 3/2006 | De Frutos et al. |
| 7,021,072 | B2 | 4/2006 | McMillan et al. |
| 7,075,255 | B1 * | 7/2006 | Gambiana ............... H02P 25/16 318/66 |
| 7,116,070 | B2 | 10/2006 | MacKay |
| 7,177,534 | B2 | 2/2007 | Jones et al. |
| 7,181,954 | B2 | 2/2007 | Horie |
| 7,265,512 | B2 | 9/2007 | McMillan et al. |
| 7,590,334 | B2 | 9/2009 | Yabusaki et al. |
| 8,084,982 | B2 | 12/2011 | Grabinger et al. |
| 8,395,338 | B2 | 3/2013 | Kuroda et al. |
| 8,606,016 | B2 | 12/2013 | Hou et al. |
| 8,786,234 | B2 | 7/2014 | Kuster et al. |
| 8,947,031 | B1 | 2/2015 | Diamond et al. |
| 2002/0121872 | A1 | 9/2002 | Boisvert et al. |
| 2003/0063900 | A1 | 4/2003 | Wang et al. |
| 2004/0105664 | A1 | 6/2004 | Ivankovic |
| 2005/0082277 | A1 * | 4/2005 | Jones ..................... F24F 11/76 219/494 |
| 2008/0051024 | A1 | 2/2008 | Caliendo et al. |
| 2010/0076605 | A1 * | 3/2010 | Harrod .................. F24F 11/30 700/276 |
| 2010/0106319 | A1 | 4/2010 | Grohman et al. |
| 2012/0290136 | A1 | 11/2012 | Romanowich et al. |
| 2015/0108933 | A1 | 4/2015 | Diamond et al. |

FOREIGN PATENT DOCUMENTS

| | | |
|---|---|---|
| CN | 102112820 | 6/2011 |
| CN | 102160269 | 8/2011 |

OTHER PUBLICATIONS

Notice of Allowance on U.S. Appl. No. 14/983,229, dated Jan. 6, 2017, 8 pages.
U.S. Appl. No. 14/983,229, filed Dec. 29, 2015, Johnson Controls Technology Company.
Notice of Allowance on U.S. Appl. No. 13/533,894, dated Sep. 19, 2014, 8 pages.
Office Action on U.S. Appl. No. 13/533,894, dated Jun. 6, 2014, 8 pages.

* cited by examiner

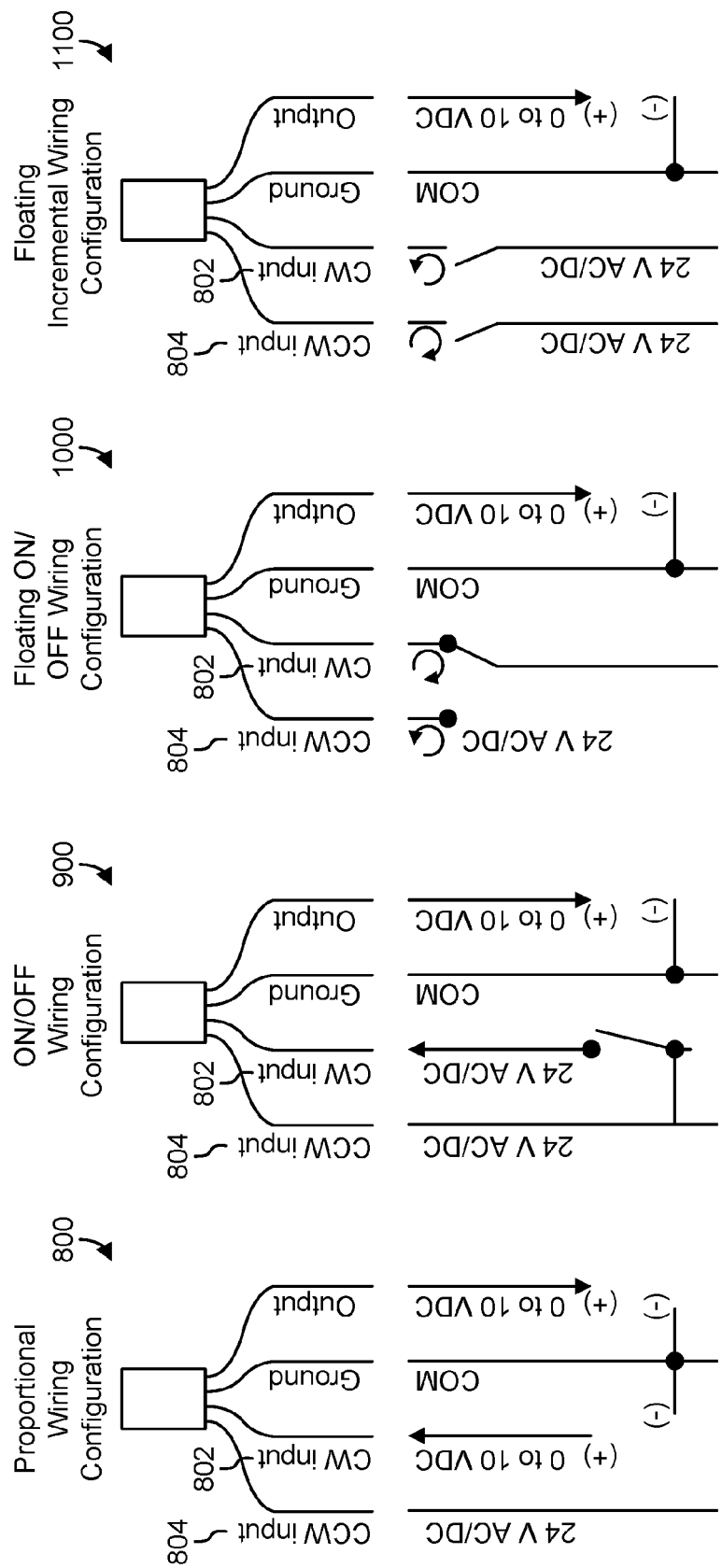

FIG. 19 — 1900

Existing PWA Design Configuration Wiring Use Case Study — 802

| CASE | Mode | | Wire Connections | | | | Expected Operation |
|---|---|---|---|---|---|---|---|
| | PROP/FLT | DA/RA | BLACK | RED (CCW) | GREY (CW) | ORANGE | |
| 1 | PROP | DA | COMMON | 24VAC | 0-20VDC | 0-10VDC | Proportional control of actuator's output hub position between 0 and 95 degrees |
| 2 | PROP | DA | COMMON | 24VAC | 24VAC | 0-10VDC | Actuator drives CW to 95 degree position (AC Override to 95°) |
| 3 | PROP | DA | COMMON | 24VAC | 0VAC | 0-10VDC | Actuator drives CCW to 0 degree position (AC Override to 0°) |
| 4 | PROP | DA | COMMON | 0VAC | 24VAC | 0-10VDC | Actuator drives CW to 95 degree position (AC Override to 95°) |
| 5 | FLT | DA | COMMON | 24VAC | 24VAC | N/A | Actuator drives CW to 95 degree position |
| 6 | FLT | DA | COMMON | 24VAC | 0VAC | N/A | Actuator drives CW to 95 degree position |
| 7 | FLT | DA | COMMON | 0VAC | 24VAC | N/A | Actuator drives CCW to 0 degree position |
| 8 | FLT | DA | COMMON | 24VAC | 0-20VDC | N/A | Actuator remains at current setpoint |

1902 → PROP/FLT column

FIG. 20 — 2000

Proposed PWA Configuration Wiring Use Case Study (Removal of PROP/FLT Switch) — 802

| CASE | Mode | Wire Connections | | | | Expected Operation |
|---|---|---|---|---|---|---|
| | DA/RA | BLACK | RED (CCW) | GREY (CW) | ORANGE | |
| 1 | DA | COMMON | 24VAC | 0-20VDC | 0-10VDC | Proportional control of actuator's output hub position between 0 and 95 degrees |
| 2 | DA | COMMON | 24VAC | 24VAC | 0-10VDC | Actuator drives CW to 95 degree position |
| 3 | DA | COMMON | 24VAC | 0VAC | 0-10VDC | Actuator drives CCW to 0 degree position |
| 4 | DA | COMMON | 0VAC | 24VAC | 0-10VDC | Actuator drives CW to 95 degree position |
| 5 | DA | COMMON | 24VDC | 0V | 0-10VDC | Actuator drives CCW to 0 degree position |
| 6 | DA | COMMON | 0V | 24VDC | 0-10VDC | Actuator drives CW to 95 degree position |
| 7 | DA | COMMON | 24VCC | 24VDC | 0-10VDC | Actuator drives CW to 95 degree position |

PLUG AND PLAY UNIVERSAL INPUT ACTUATOR

CROSS-REFERENCE TO RELATED PATENT APPLICATIONS

This application claims the benefit of and priority to U.S. Provisional Patent Application No. 62/135,008 filed Mar. 18, 2015, and U.S. Provisional Patent Application No. 62/288,402 filed Jan. 28, 2016, the entireties of which are incorporated by reference herein.

BACKGROUND

The present disclosure relates generally to actuators in a heating, ventilating or air conditioning (HVAC) system. HVAC actuators are used to operate a wide variety of HVAC components such as air dampers, fluid valves, air handling units, and other components that are used in HVAC systems. For example, an actuator can be coupled to a damper in a HVAC system and can be used to drive the damper between an open position and a closed position. A HVAC actuator typically includes a motor and a drive device (e.g., a hub, a drive train, etc.) that is driven by the motor and coupled to the HVAC component.

Multiple wiring configurations for HVAC actuators exist, including: proportional, ON/OFF, floating ON/OFF, and floating incremental. Depending on the wiring configuration, the HVAC actuator can operate in a particular mode of operation, including a proportional mode, in which the actuator may drive to an intermediate position between a minimum rotational position and a maximum rotational position based on the value of an input signal, and a floating mode, in which the actuator may drive between a minimum rotational position and a maximum rotational position based on the presence of an input signal. Existing solutions to select the mode of operation generally involve an external tool or a DIP switch. However, these solutions are unsatisfactory because they rely on the operator to select the mode of operation, complicating the installation process and introducing the potential for error.

SUMMARY

One implementation of the present disclosure is an actuator in a HVAC system. The actuator includes a motor and a drive device driven by the motor. The drive device is coupled to a movable HVAC component for driving the movable HVAC component between multiple positions. The actuator further includes an input connection that receives an input signal. The actuator further includes a processing circuit. The processing circuit is coupled to the motor and determines whether the input signal is an AC voltage signal or a DC voltage signal. The processing circuit operates the motor using an AC motor control technique in response to determining that the input signal is the AC voltage signal. The processing circuit further operates the motor using a DC motor control technique in response to determining that the input signal is the DC voltage signal.

In some embodiments, the processing circuit includes a controller. In some embodiments, the processing circuit includes an AC voltage detector that provides an AC detection signal to the controller in response to determining that the input signal is the AC voltage signal. In some embodiments, the processing circuit includes a DC voltage detector that provides a DC detection signal to the controller in response to determining that the input signal is the DC voltage signal. The controller can operate the motor using the AC motor control technique in response to receiving the AC detection signal from the AC voltage detector. The controller can operate the motor using the DC motor control technique in response to receiving the DC detection signal from the DC voltage detector.

In some embodiments, the input connection has a proportional wiring configuration. In some embodiments, the proportional wiring configuration can include a clockwise input connection that receives the DC voltage signal. In some embodiments, the proportional wiring configuration can include a counterclockwise input connection that receives a steady AC or DC voltage.

In some embodiments, the DC motor control technique includes determining a setpoint position for the drive device proportional to a value of the DC voltage signal. In some embodiments, the DC motor control technique includes operating the motor to drive the drive device to the setpoint position.

In some embodiments, the input connection has an ON/OFF wiring configuration. In some embodiments, the ON/OFF wiring configuration includes a clockwise input connection. The clockwise input connection can include a clockwise input switch. In some embodiments, the clockwise input connection receives a steady AC or DC voltage when the clockwise input switch is closed and a zero voltage when the clockwise input switch is open. In some embodiments, the ON/OFF wiring configuration includes a counterclockwise input connection that receives a steady AC or DC voltage.

In some embodiments, the AC motor control technique is an ON/OFF control technique. In some embodiments, the ON/OFF control technique includes operating the motor to drive the drive device to a maximum rotational position in a clockwise direction when the clockwise input switch is closed and the steady AC or DC voltage is received by the clockwise input connection. In some embodiments, the ON/OFF control technique includes operating the motor to drive the drive device to a minimum rotational position in a counterclockwise direction when the clockwise input switch is open and zero voltage is received by the clockwise input connection.

In some embodiments, the input connection has a floating ON/OFF wiring configuration. In some embodiments, the floating ON/OFF wiring configuration includes a clockwise input connection and a counterclockwise input connection. In some embodiments, the floating ON/OFF wiring configuration can further include a switch that toggles between a first position and a second position. In the first position, a steady AC or DC voltage can be provided to the clockwise input connection and zero voltage can be provided to the counterclockwise input connection. In the second position, zero voltage can be provided to the clockwise input connection and a steady AC or DC voltage can be provided to the counterclockwise input connection.

In some embodiments, the AC motor control technique is a floating ON/OFF control technique. In some embodiments, the floating ON/OFF control technique includes operating the motor to drive the drive device to a maximum rotational position in a clockwise direction when the switch is in the first position and a steady AC or DC voltage is provided to the clockwise input connection. In some embodiments, the floating ON/OFF control technique includes operating the motor to drive the drive device to a minimum rotational position in a counterclockwise direction when the switch is in the second position and zero voltage is provided to the clockwise input connection.

In some embodiments, the input connection has a floating incremental wiring configuration. In some embodiments, the floating incremental wiring configuration includes a clockwise input connection. The clockwise input connection can include a clockwise input switch. The clockwise input connection can receive a steady AC or DC voltage when the clockwise input switch is closed and to receive zero voltage when the clockwise input switch is open. In some embodiments, the floating incremental wiring configuration includes a counterclockwise input connection. The counterclockwise input connection can include a counterclockwise input switch. The counterclockwise input connection can receive a steady AC or DC voltage when the counterclockwise input switch is closed and to receive zero voltage when the counterclockwise input switch is open.

In some embodiments, the AC motor control signal technique is a floating incremental control technique. In some embodiments, the floating incremental control technique can include operating the motor to drive the drive device to a maximum rotational position in a clockwise direction when the clockwise input switch is closed and a steady AC or DC voltage is provided to the clockwise input connection. In some embodiments, the floating incremental control technique can include operating the motor to drive the drive device to a minimum rotational position in a counterclockwise direction when the counterclockwise input switch is closed and the clockwise input switch is open such that a steady AC or DC voltage is provided to the counterclockwise input connection and zero voltage is provided to the clockwise input connection. In some embodiments, the floating incremental control technique can include preventing the motor from driving the drive device when the clockwise input switch and the counterclockwise input switch are both open such that zero voltage is provided to both the clockwise input connection and the counterclockwise input connection.

Another implementation of the present disclosure is a method for controlling a HVAC actuator. The HVAC actuator includes a motor and a drive device driven by the motor and coupled to a movable HVAC component. The method includes receiving an input signal at an input connection of the actuator. The method involves determining, by a processing circuit of the actuator, whether the input signal is an AC voltage signal or a DC voltage signal. The method includes operating, by the processing circuit, the motor using an AC motor control technique in response to determining that the input signal is the AC voltage signal. The method involves operating, by the processing circuit, the motor using a DC motor control technique in response to determining that the input signal is the DC voltage signal.

In some embodiments, the method includes providing an AC detection signal from an AC voltage detector to a controller in response to determining that the input signal is the AC voltage signal. In some embodiments, operating the motor using the AC motor control technique occurs in response to the controller receiving the AC detection signal from the AC voltage detector. In some embodiments, the method includes providing a DC detection signal from a DC voltage detector to the controller in response to determining that the input signal is the DC voltage signal. In some embodiments, operating the motor using the DC motor control technique occurs in response to the controller receiving the DC detection signal from the DC voltage detector.

In some embodiments, receiving an input signal at an input connection of the actuator includes receiving a DC voltage signal at a clockwise input connection. In some embodiments, receiving an input signal at an input connection of the actuator includes receiving a steady AC or DC voltage at a counterclockwise input connection.

In some embodiments, operating the motor using a DC motor control technique includes determining a setpoint position for the drive device proportional to a value of the DC voltage signal. In some embodiments, operating the motor using a DC motor control technique includes operating the motor to drive the drive device to the setpoint position.

In some embodiments, receiving an input signal at an input connection of the actuator includes receiving a steady AC or DC voltage at a clockwise input connection when a clockwise input switch is closed. In some embodiments, receiving an input signal at an input connection of the actuator includes receiving zero voltage at the clockwise input connection when the clockwise input switch is open. In some embodiments, receiving an input signal at an input connection of the actuator includes receiving a steady AC or DC voltage at a counterclockwise input connection.

In some embodiments, operating the motor using an AC motor control technique includes operating the motor to drive the drive device to a maximum rotational position in a clockwise direction when the clockwise input switch is closed and the steady AC or DC voltage is received by the clockwise input connection. In some embodiments, operating the motor using an AC motor control technique includes operating the motor to drive the drive device to a minimum rotational position in a counterclockwise direction when the clockwise input switch is open and zero voltage is received by the clockwise input connection.

In some embodiments, receiving an input signal at an input connection of the actuator includes receiving a steady AC or DC voltage at a clockwise input connection and zero voltage at a counterclockwise input connection when a switch is toggled to a first position. In some embodiments, receiving an input signal at an input connection of the actuator includes receiving zero voltage at the clockwise input connection and the steady AC or DC voltage at the counterclockwise input connection when the switch is toggled to second position.

In some embodiments, operating the motor using an AC motor control technique includes operating the motor to drive the drive device to a maximum rotational position in a clockwise direction when the switch is in the first position and the steady AC or DC voltage is provided to the clockwise input connection. In some embodiments, operating the motor using an AC motor control technique includes operating the motor to drive the drive device to a minimum rotational position in a counterclockwise direction when the switch is in the second position and zero voltage is provided to the clockwise input connection.

In some embodiments, receiving an input signal at an input connection of the actuator includes receiving a steady AC or DC voltage at a clockwise input connection when a clockwise input switch is closed, and receiving zero voltage at the clockwise input connection when the clockwise input switch is open. In some embodiments, receiving an input signal at an input connection of the actuator includes receiving a steady AC or DC voltage at a counterclockwise input connection when a counterclockwise input switch is closed, and receiving zero voltage at the counterclockwise input connection when the counterclockwise input switch is open.

In some embodiments, operating the motor using an AC motor control technique includes operating the motor to drive the drive device to a maximum rotational position in a clockwise direction when the clockwise input switch is closed and the steady AC or DC voltage is provided to the clockwise input connection. In some embodiments, operating the motor using an AC motor control technique includes operating the motor to drive the drive device to a minimum rotational position in a counterclockwise direction when the counterclockwise input switch is closed and the clockwise input switch is open such that the steady AC or DC voltage is provided to the counterclockwise input connection and zero voltage is provided to the clockwise input connection. In some embodiments, operating the motor using an AC motor control technique includes preventing the motor from driving the drive device when the clockwise input switch and the counterclockwise input switch are both open such that zero voltage is provided to both the clockwise input connection and the counterclockwise input connection Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 8-11 are detailed wiring diagrams for the actuator illustrated in FIG. 5, according to some embodiments.

FIG. 19 is a table depicting the expected actuator operation when the processing circuit does not contain an AC input detector and a DC input detector, according to some embodiments.

FIG. 20 is a table depicting the expected actuator operation when the processing circuit does contain an AC input detector and a DC input detector, according to some embodiments.

DETAILED DESCRIPTION

Overview

Referring generally to the FIGURES, a HVAC actuator with the ability to accept universal input is shown, according to some embodiments. The actuator can be a damper actuator, a valve actuator, a fan actuator, a pump actuator, or any other type of actuator that can be used in a HVAC system. The actuator includes an input connection configured to receive an input signal (e.g., from a controller), a motor, a processing circuit configured to control the motor based on the input signal, and a drive device driven by the motor. The drive device can be connected to a movable HVAC component (e.g., a damper, a valve, etc.) and can be configured to move the HVAC component through a range of positions.

The actuator can accept a variety of different types of input signals such as an AC voltage signal and a DC voltage signal. In some embodiments, the actuator automatically determines whether the input signal is an AC voltage signal or a DC voltage signal. The actuator can operate the motor using an AC motor control technique (e.g., ON/OFF control, floating ON/OFF control, floating incremental control, etc.) in response to determining that the input signal is an AC voltage signal. Similarly, the actuator can operate the motor using a DC motor control technique (e.g., proportional control) in response to determining that the input signal is a DC voltage signal. The actuator can automatically select the mode of operation based on the type of input signal received without requiring an external configuration tool, a user-operable mode selection switch, or user-operable DIP switches. Additional features and advantages of the HVAC actuator are described in greater detail below.

Building Management System and HVAC System

Figure 1:
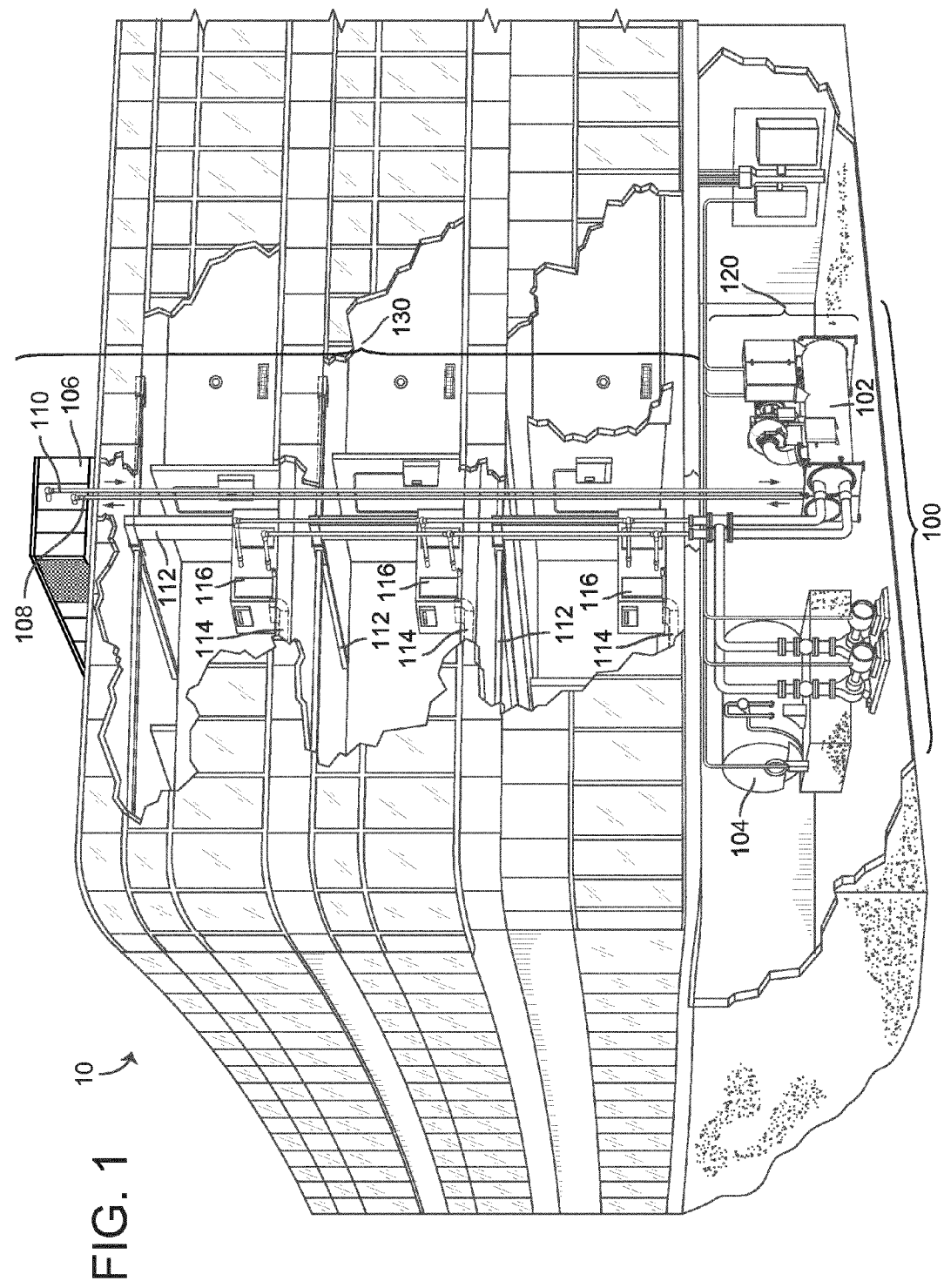
FIG. 1 is a perspective view of a building with a heating, ventilation, or air conditioning (HVAC) system and a building management system (BMS), according to some embodiments.

Referring now to FIGS. 1-4, a building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include multiple HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. A waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
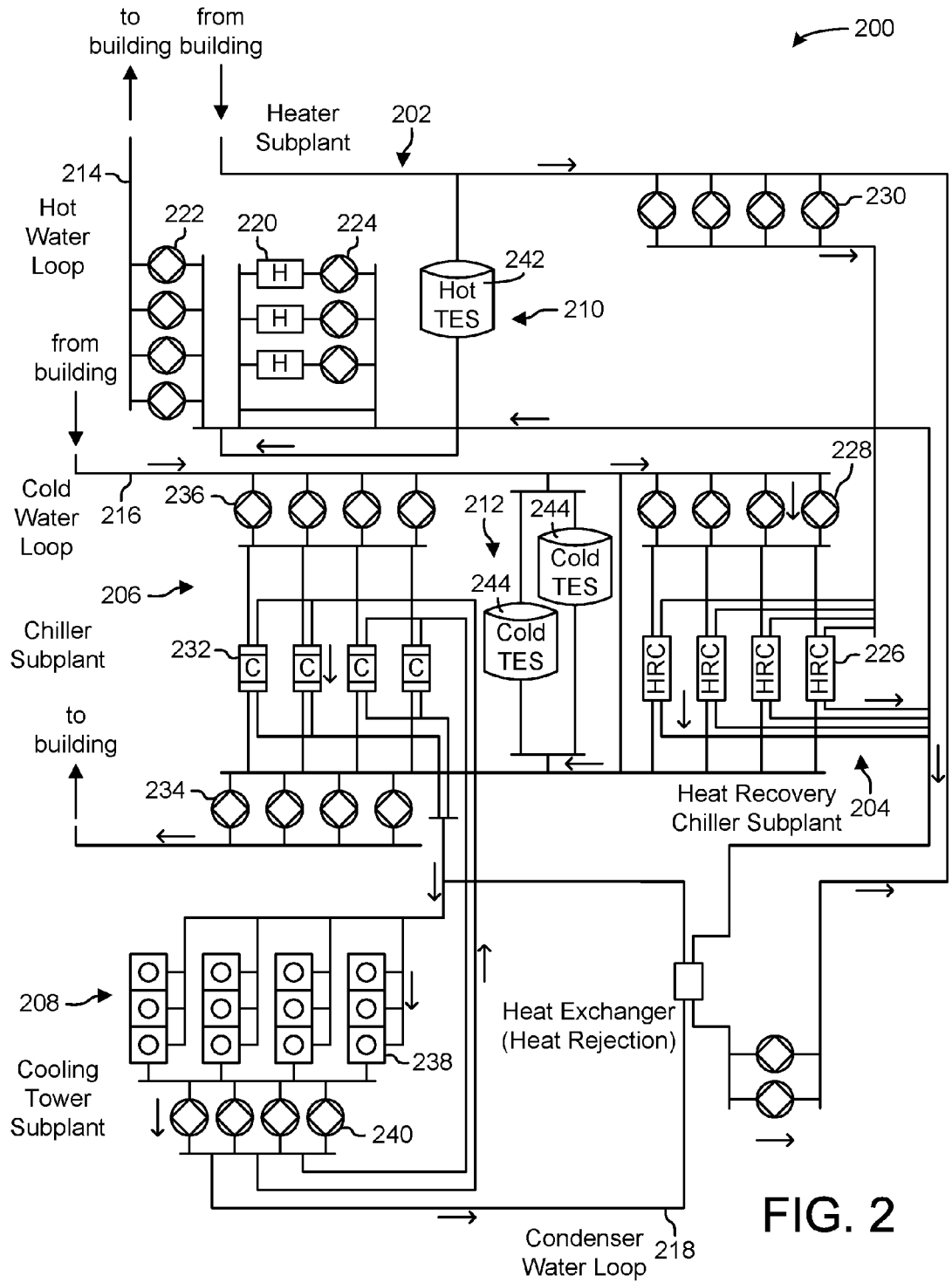
FIG. 2 is a schematic diagram of a waterside system which can be used to support the HVAC system of FIG. 1, according to some embodiments.

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having multiple subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include multiple heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include multiple chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include multiple heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include multiple cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
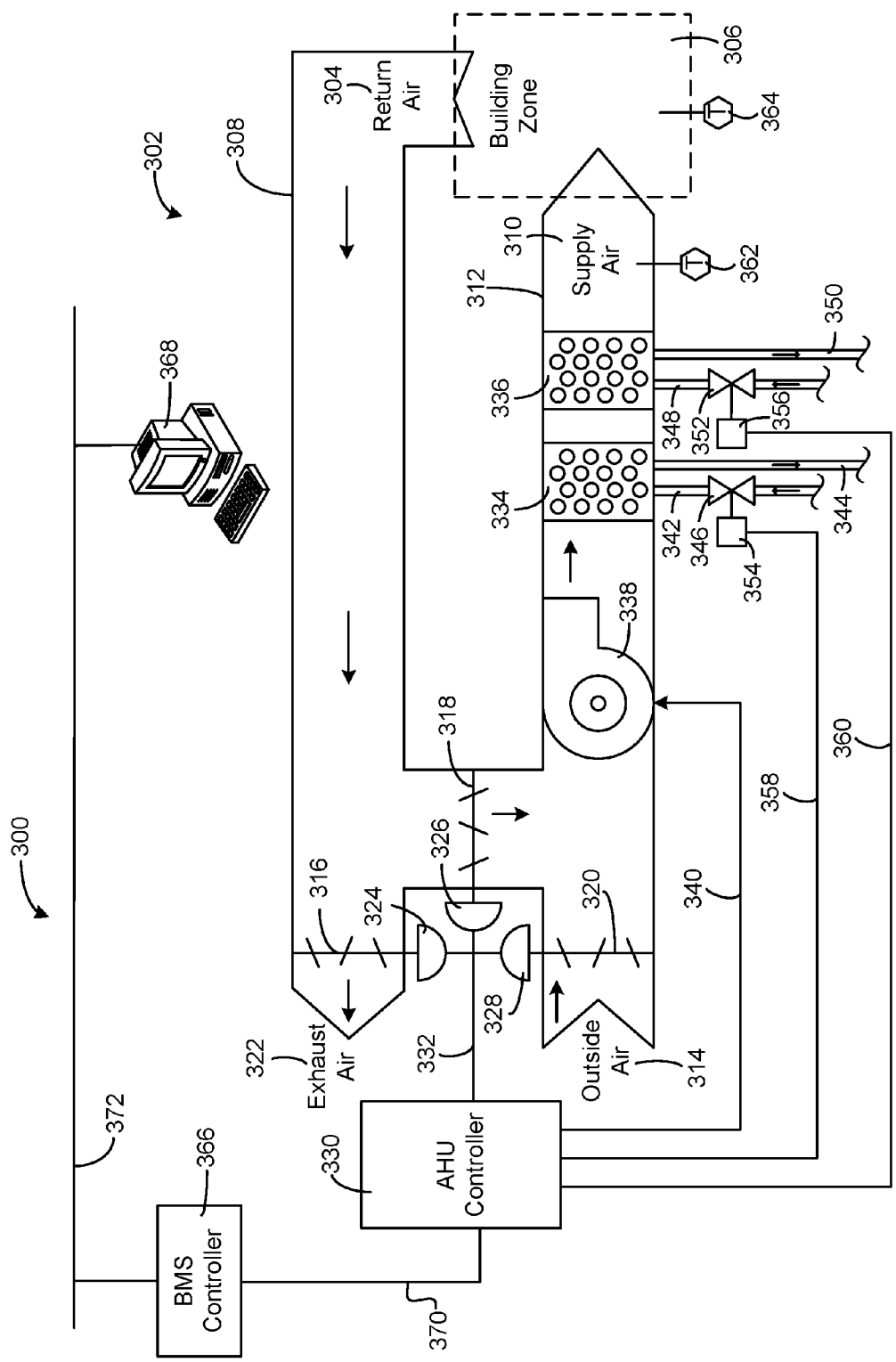
FIG. 3 is a block diagram of an airside system which can be used as part of the HVAC system of FIG. 1, according to some embodiments.

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
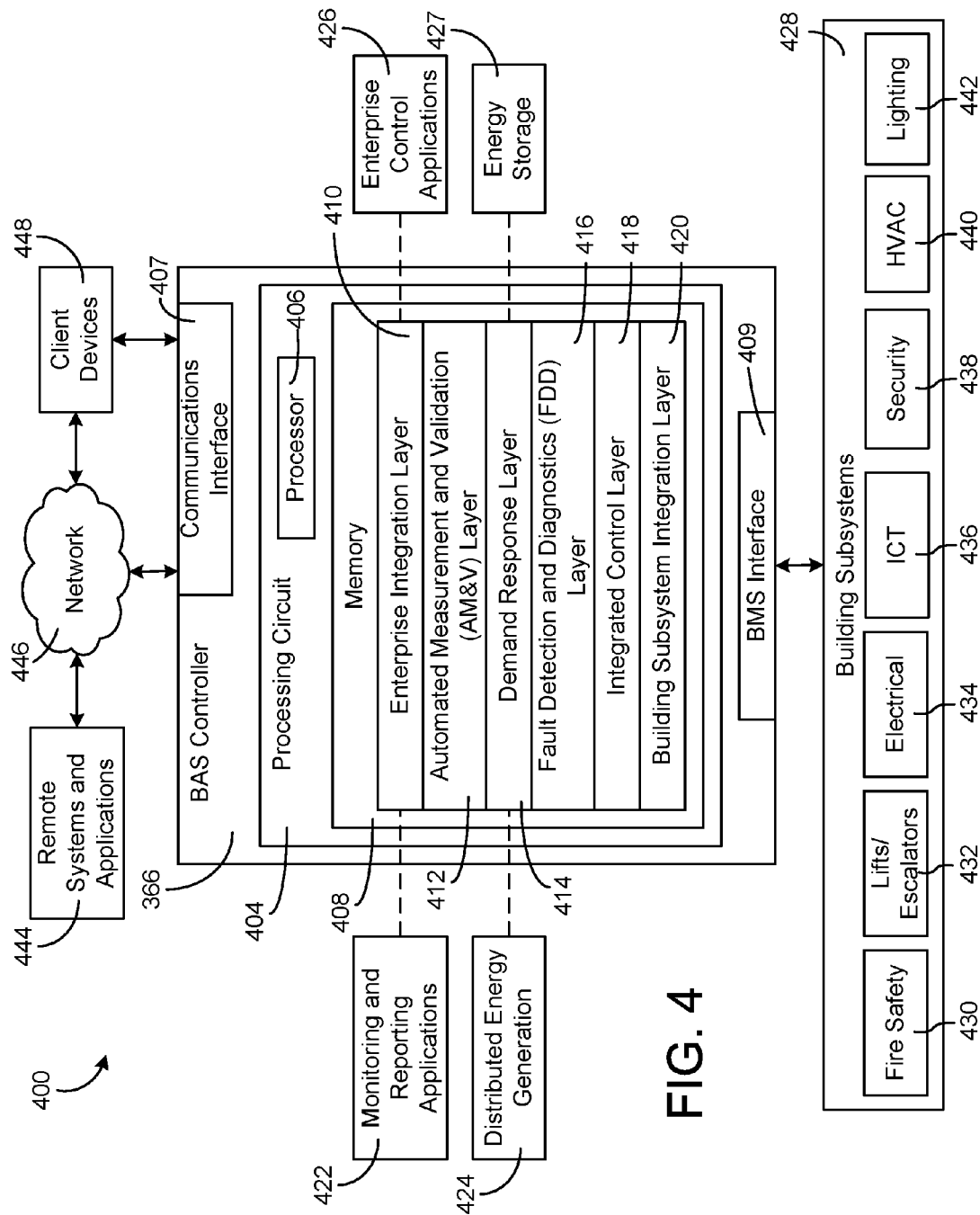
FIG. 4 is a block diagram of a BMS which can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and multiple building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across multiple multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from multiple building subsystems to provide greater comfort and energy savings relative to the comfort and energy savings that separate subsystems could provide alone. For example, integrated control layer 418 can be configured to use an input from a first subsystem to make an energy-saving control decision for a second subsystem.

Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Universal Input Actuator

Figure 5:
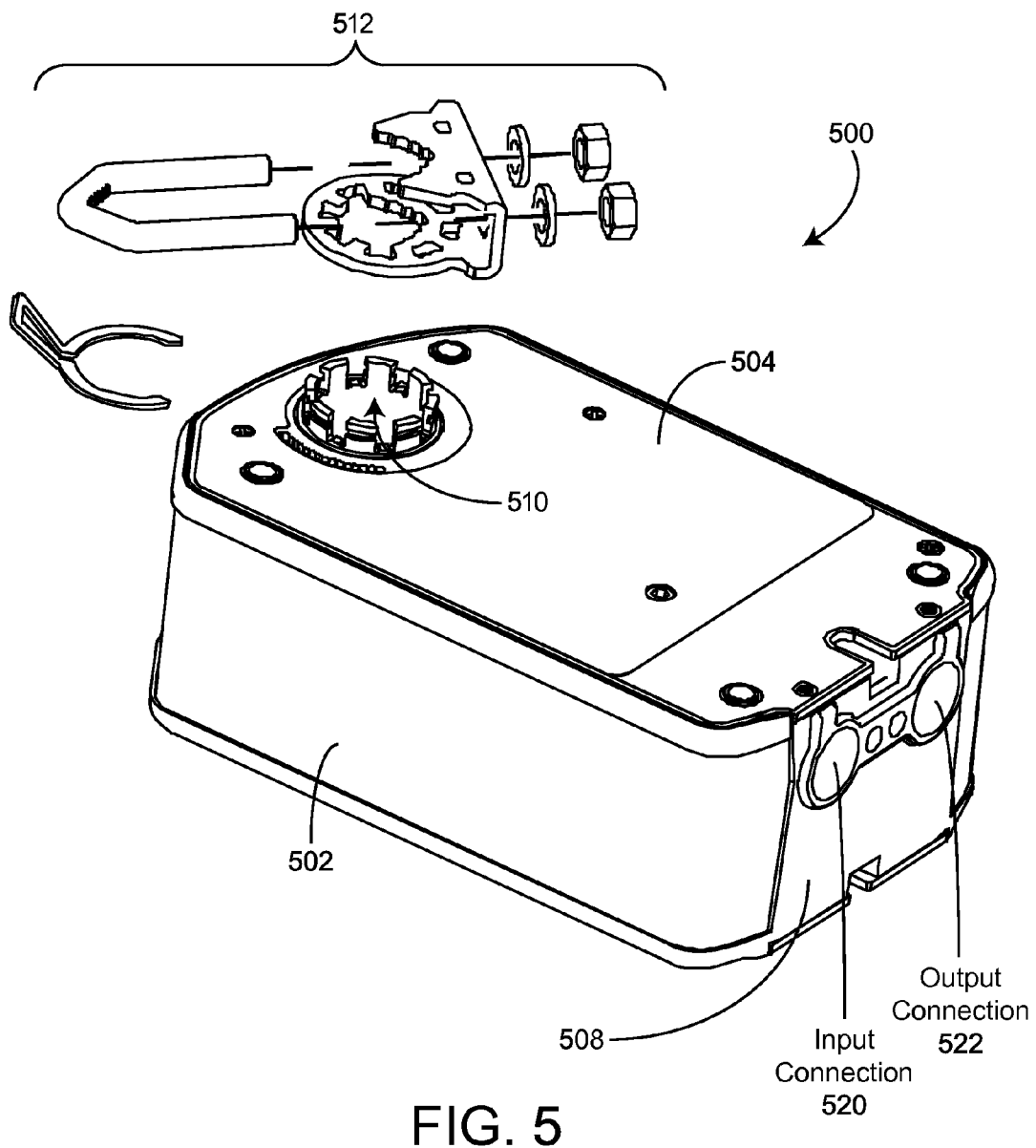
FIG. 5 is a perspective view schematic drawing of an actuator which can be used in the HVAC system of FIG. 1, the waterside system of FIG. 2, the airside system of FIG. 3, or the BMS of FIG. 4 to control a HVAC component, according to some embodiments
Figure 7:
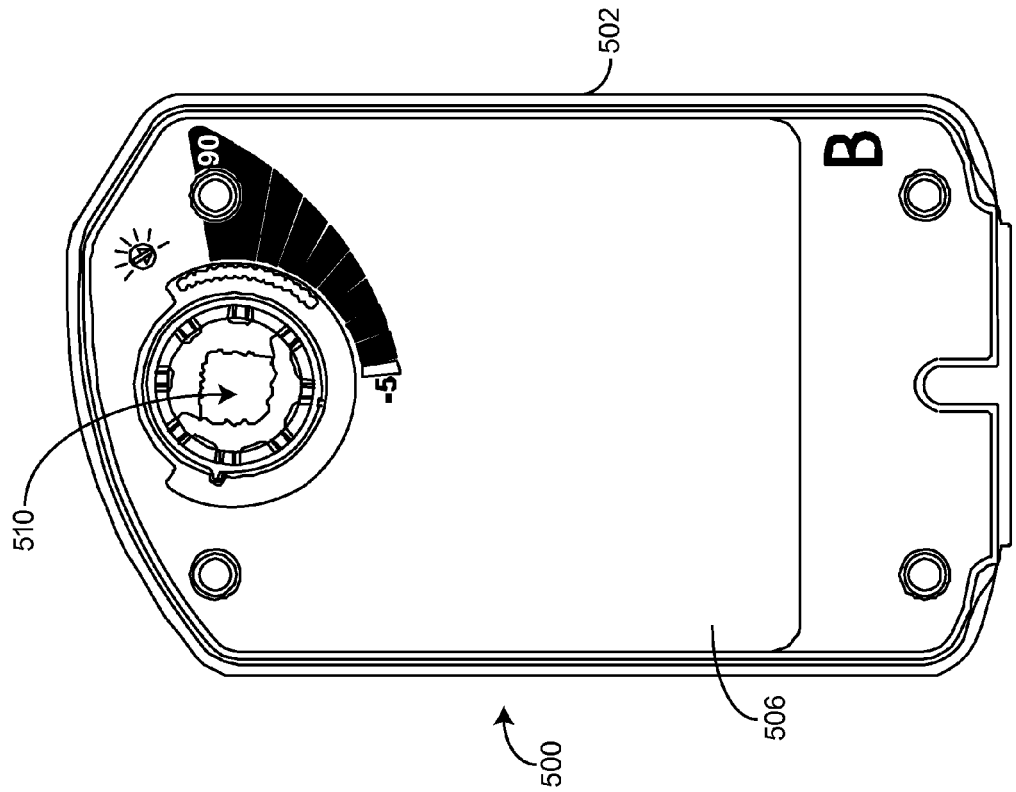
FIG. 7 is a bottom view schematic drawing of the actuator illustrated in FIG. 5, according to some embodiments.
Figure 6:
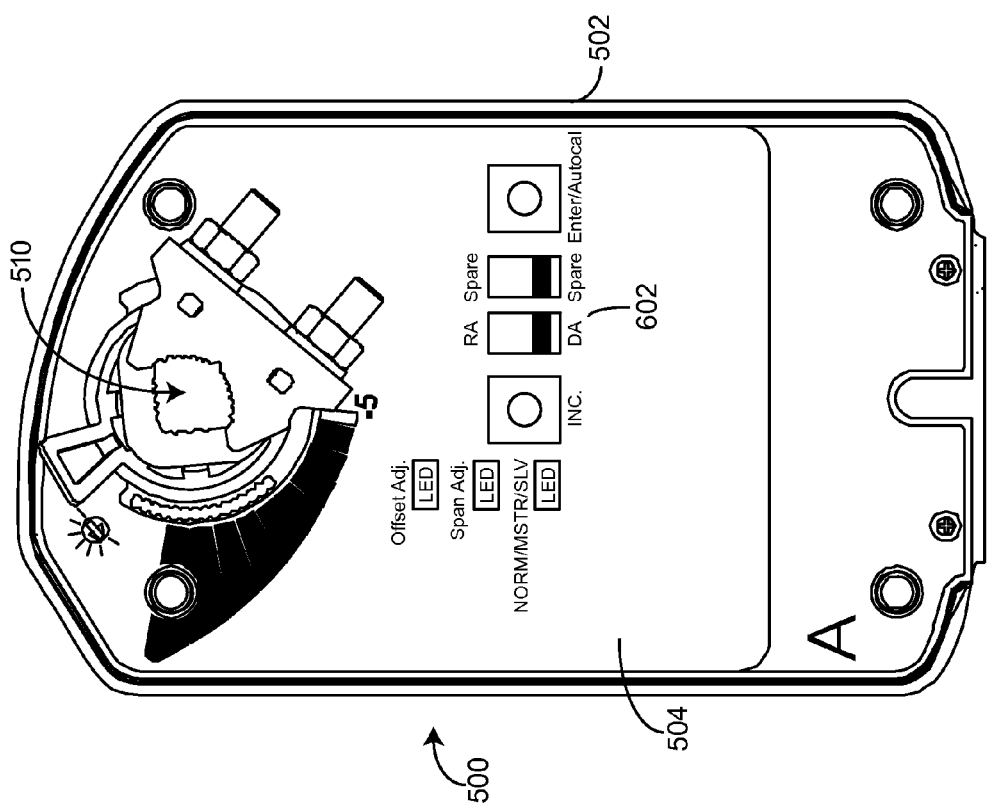
FIG. 6 is a top view schematic drawing of the actuator illustrated in FIG. 5, according to some embodiments.

Referring now to FIGS. 5-7, an actuator 500 for use in a HVAC system is shown, according to some embodiments. In some implementations, actuator 500 can be used in HVAC system 100, waterside system 200, airside system 300, or BMS 400, as described with reference to FIGS. 1-4. For example, actuator 500 can be a damper actuator, a valve actuator, a fan actuator, a pump actuator, or any other type of actuator that can be used in a HVAC system or BMS. In various embodiments, actuator 500 can be a linear actuator (e.g., a linear proportional actuator), a non-linear actuator, a spring return actuator, or a non-spring return actuator.

Actuator 500 is shown to include a housing 502 having a front side 504 (i.e., side A), a rear side 506 (FIG. 7) (i.e., side B) opposite front side 504, and a bottom 508. Housing 502 can contain the mechanical and processing components of actuator 500. The internal components of actuator 500 are described in greater detail with reference to FIGS. 12 and 13.

Actuator 500 is shown to include a drive device 510. Drive device 510 can be a drive mechanism, a hub, or other device configured to drive or effectuate movement of a HVAC system component. For example, drive device 510 can be configured to receive a shaft of a damper, a valve, or any other movable HVAC system component in order to drive (e.g., rotate) the shaft. In some embodiments, actuator 500 includes a coupling device 512 configured to aid in coupling drive device 510 to the movable HVAC system component. For example, coupling device 512 can facilitate attaching drive device 510 to a valve or damper shaft.

Actuator 500 is shown to include an input connection 520 and an output connection 522. In some embodiments, input connection 520 and output connection 522 are located along bottom 508. In other embodiments, input connection 520 and output connection 522 can be located along one or more other surfaces of housing 502. Input connection 520 can be configured to receive a control signal (e.g., a voltage input signal) from an external system or device. Actuator 500 can use the control signal to determine an appropriate output for the motor. In some embodiments, the control signal is received from a controller such as an AHU controller (e.g., AHU controller 330), an economizer controller, a supervisory controller (e.g., BMS controller 366), a zone controller, a field controller, an enterprise level controller, a motor controller, an equipment-level controller (e.g., an actuator controller) or any other type of controller that can be used in a HVAC system or BMS.

In some embodiments, the control signal is a DC voltage signal. Actuator 500 can be a linear proportional actuator configured to control the position of drive device 510 according to the value of the DC voltage received at input connection 520. For example, a minimum input voltage (e.g., 0.0 VDC) may correspond to a minimum rotational position of drive device 510 (e.g., 0 degrees, −5 degrees, etc.), whereas a maximum input voltage (e.g., 10.0 VDC) may correspond to a maximum rotational position of drive device 510 (e.g., 90 degrees, 95 degrees, etc.). Input voltages between the minimum and maximum input voltages can cause actuator 500 to move drive device 510 into an intermediate position between the minimum rotational position and the maximum rotational position. In other embodiments, actuator 500 can be a non-linear actuator or can use different input voltage ranges or a different type of input signal (e.g., AC voltage or current) to control the position and/or rotational speed of drive device 510.

In some embodiments, the control signal is an AC voltage signal. Input connection 520 can be configured to receive an AC voltage signal having a voltage of 24 VAC or a standard power line voltage (e.g., 120 VAC or 230 VAC at 50/60 Hz). The frequency of the voltage signal can be modulated (e.g., by a controller for actuator 500) to adjust the rotational position and/or speed of drive device 510. In some embodiments, actuator 500 uses the voltage signal to power various components of actuator 500. Actuator 500 can use the AC voltage signal received via input connection 520 as a control signal, a source of electric power, or both. In some embodiments, the voltage signal is received at input connection 520 from a power supply line that provides actuator 500 with an AC voltage having a constant or substantially constant frequency (e.g., 120 VAC or 230 VAC at 50 Hz or 60 Hz). Input connection 520 can include one or more data connections (separate from the power supply line) through which actuator 500 receives control signals from a controller or another actuator (e.g., 0-10 VDC control signals).

In some embodiments, the control signal is received at input connection 520 from another actuator. For example, if multiple actuators are interconnected in a tandem arrangement, input connection 520 can be connected (e.g., via a communications bus) to the output data connection of another actuator. One of the actuators can be arranged as a master actuator with its input connection 520 connected to a controller, whereas the other actuators can be arranged as slave actuators with their respective input connections connected to the output connection 522 of the master actuator.

Output connection 522 can be configured to provide a feedback signal to a controller of the HVAC system or BMS in which actuator 500 is implemented (e.g., an AHU controller, an economizer controller, a supervisory controller, a zone controller, a field controller, an enterprise level controller, etc.). The feedback signal can indicate the rotational position and/or speed of actuator 500. In some embodiments, output connection 522 can be configured to provide a control signal to another actuator (e.g., a slave actuator) arranged in tandem with actuator 500. Input connection 520 and output connection 522 can be connected to the controller or the other actuator via a communications bus. The communications bus can be a wired or wireless communications link and can use any of a variety of disparate communications protocols (e.g., BACnet, LON, WiFi, Bluetooth, NFC, TCP/IP, etc.).

Referring particularly to FIG. 6, a variety of user input controls are shown, according to one embodiment. For example, the user input controls can contain a mode selection switch 602. The user can adjust the position of mode selection switch 602 in order to set actuator 500 to operate in a direct acting mode, a reverse acting mode, or a calibration mode. It should be understood that these controls are optional components and are not required for actuator 500 to perform the processes described herein. As such, one or more of these user input controls can be omitted without departing from the teachings of the present invention.

Referring now to FIGS. 8-11, various configurations of wiring input connection 520 and output connection 522 are shown, according to some embodiments. In various embodiments, input connection 520 can contain clockwise input connection 802 and counterclockwise input connection 804. Clockwise input connection 802 and counterclockwise input connection 804 can be utilized as signals to control both the rotational position of drive device 510 and the direction of rotation (i.e., clockwise or counterclockwise movement).

Referring particularly to FIG. 8, proportional wiring configuration 800 is shown. In this configuration, clockwise input 802 is a DC voltage signal, counterclockwise input 804 is a steady voltage signal (e.g., 24 VAC or 24 VDC), and actuator 500 can act as a linear proportional actuator. When acting as a linear proportional actuator, actuator 500 controls the position of drive device 510 according to the value of the DC voltage received. For example, a minimum clockwise input voltage (e.g., 0.0 VDC) may correspond to a minimum rotational position of drive device 510 (e.g., 0 degrees, −5 degrees, etc.), whereas a maximum clockwise input voltage (e.g., 10.0 VDC) may correspond to a maximum rotational position of drive device 510 (e.g., 90 degrees, 95 degrees, etc.). Clockwise input voltages between the minimum and maximum input voltages can cause actuator 500 to move drive device 510 into an intermediate position between the minimum rotational position and the maximum rotational position.

Referring now to FIG. 9, ON/OFF wiring configuration 900 is shown. In this configuration, both clockwise input 802 and counterclockwise input 804 are configured to provide a steady voltage signal (e.g., 24 VAC or 24 VDC), although clockwise input 802 is connected to a switch which can be positioned between ON and OFF configurations. Since the input signals are configured to provide a steady voltage, actuator 500 is not configured to act as a linear proportional actuator (i.e., actuator 500 may not move drive device 510 to any intermediate positions between the minimum and maximum rotational positions). When clockwise input 802 is in the ON position, clockwise input 802 provides a steady voltage which causes actuator 500 to move drive device 510 to its maximum rotational position (e.g., 90 degrees, 95 degrees, etc.). When the clockwise input 802 is in the OFF position, the clockwise input 802 provides no voltage (e.g., 0 VAC or 0 VDC) and actuator 500 may move drive device 510 to the minimum rotational position (e.g., 0 degrees, −5 degrees, etc.).

Referring now to FIGS. 10 and 11, two versions of a floating wiring configuration are shown. FIG. 10 depicts floating ON/OFF wiring configuration 1000 in which both clockwise input 802 and counterclockwise input 804 are configured to provide a steady voltage signal (e.g., 24 VAC or 24 VDC), and both are connected to a single switch. For example, if clockwise input 802 is in the ON position, counterclockwise input 804 must be in the OFF position, and vice versa. Similar to the ON/OFF wiring configuration, when the clockwise input 802 is in the ON position (and counterclockwise input 804 is in the OFF position), the clockwise input 802 provides a steady voltage which causes actuator 500 to move drive device 510 to its maximum rotational position (e.g., 90 degrees, 95 degrees, etc.). When clockwise input 802 is in the OFF position (and counterclockwise input signal is in the ON position), clockwise input 802 provides no voltage (e.g., 0 VAC or 0 VDC) and actuator 500 may move drive device 510 to the minimum rotational position (e.g., 0 degrees, −5 degrees, etc.).

Referring now to FIG. 11, a different wiring configuration, floating incremental wiring configuration 1100, is depicted in which both clockwise input 802 and counterclockwise input 804 are configured to provide a steady voltage signal (e.g., 24 VAC or 24 VDC), and both input signals are connected to separate ON/OFF switches. Unlike the configuration depicted in FIG. 10, the presence of clockwise input 802 does not determine the presence of counterclockwise input 804, and vice versa. When clockwise input 802 is in the ON position and the counterclockwise input 804 is in the OFF position, clockwise input 802 provides a steady voltage which causes actuator 500 to move drive device 510 to its maximum rotational position (e.g., 90 degrees, 95 degrees, etc.). When the clockwise input 802 is in the OFF position and the counterclockwise input 804 is in the ON position, clockwise input 802 provides no voltage (e.g., 0 VAC or 0 VDC) and actuator 500 may move drive device 510 to the minimum rotational position (e.g., 0 degrees, −5 degrees, etc.). When both the clockwise input 802 and counterclockwise input 804 are in the OFF position, actuator 500 holds drive device 510 in its current position, (e.g., at either the minimum or maximum rotational position or an incremental position between the minimum and the maximum).

Figure 12:
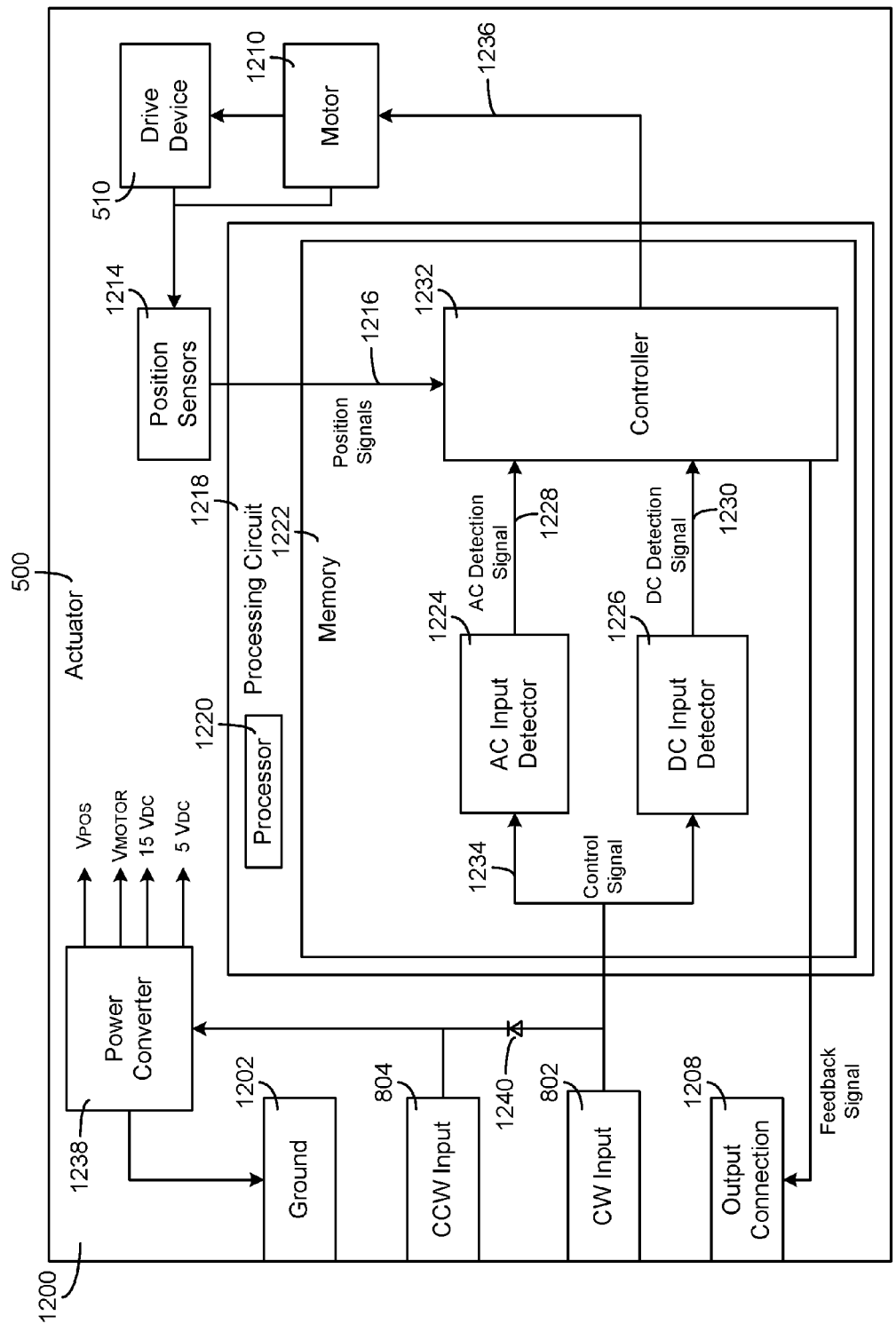
FIG. 12 is a block diagram of the actuator illustrated in FIG. 5, according to some embodiments.

Referring now to FIG. 12, a block diagram illustrating actuator 500 in greater detail is shown, according to some embodiments. Actuator 500 is shown to include ground connection 1202, counterclockwise input connection 804, clockwise input connection 802, and output connection 1208 contained within housing 1200. In some embodiments, counterclockwise input connection 804 and clockwise input connection 802 can be components of input connection 520. Clockwise input connection 802 and counterclockwise input connection 804 can provide voltage input to power converter 1238. In response, power converter 1238 can provide various output voltages (e.g., $V_{MOTOR}$, 15 VDC, 5 VDC, etc.) that can be used to power the actuator in some embodiments.

Actuator 500 is shown further to include motor 1210 connected to drive device 510, and position sensors 1214 configured to measure the position of the motor and/or the drive device. Position sensors 1214 can include Hall effect sensors, potentiometers, optical sensors, or other types of sensors configured to measure the rotational position of the motor and/or the drive device. Position sensors 1214 can provide position signals 1216 to processing circuit 1218. Processing circuit 1218 uses position signals 1216 to determine whether to operate motor 1210. For example, processing circuit 1218 can compare the current position of the drive device with a position setpoint received via input connection 520 and can operate the to achieve the position setpoint.

Still referring to FIG. 12, processing circuit 1218 is shown to include processor 1220 and memory 1222. Processor 1220 can be a general purpose or specific purpose processor, an application specific integrated circuit (ASIC), one or more field programmable gate arrays (FPGAs), a group of processing components, or other suitable processing components. Processor 1220 can be configured to execute computer code or instructions stored in memory or received from other computer readable media (e.g., CDROM, network storage, a remote server, etc.).

Memory 1222 can include one or more devices (e.g., memory units, memory devices, storage devices, etc.) for storing data and/or computer code for completing and/or facilitating the various processes described in the present disclosure. Memory 1222 include random access memory (RAM), read-only memory (ROM), hard drive storage, temporary storage, non-volatile memory, flash memory, optical memory, or any other suitable memory for storing software objects and/or computer instructions. Memory 1222 can include database components, object code components, script components, or any other type of information structure for supporting the various activities and information structures described in the present disclosure. Memory 1222 can be communicably connected to processor 1220 via processing circuit 1218 and can include computer code for executing (e.g., by the processor) one or more processes described herein. When processor 1220 executes instructions stored in memory 1222, processor 1220 generally configures actuator 500 (and more particularly the processing circuit) to complete such activities.

Processing circuit 1218 is shown to include AC input detector 1224, DC input detector 1226, and controller 1232. AC input detector 1224 and DC input detector 1226 can be configured to receive control signal 1234 from clockwise input connection 802, which can be a component of input connection 520. Processing circuit 1218 can be configured to determine whether control signal 1234 is an AC voltage signal or a DC voltage signal. Processing circuit 1218 can operate motor 1210 using an AC motor control technique in response to determining that control signal 1234 is the AC voltage signal. However, processing circuit 1218 can operate motor 1210 using a DC motor control technique in response to determining that control signal 1234 is the DC voltage signal. For example, if control signal 1234 provided by clockwise input connection 802 is an AC voltage signal, AC input detector 1224 can be configured to generate AC detection signal 1228, whereas DC input detector 1226 may not generate DC detection signal 1230. If control signal 1234 provided by clockwise input connection 802 is a DC voltage signal, DC input detector 1226 can be configured to generate DC detection signal 1230, whereas AC input detector 1224 may not generate AC detection signal 1228. If neither an AC voltage signal nor a DC voltage signal is provided by clockwise input connection 802, neither AC input detector 1224 nor DC input detector 1226 can generate a detection signal.

Still referring to FIG. 12, processing circuit 1218 is shown to include controller 1232, which is configured to receive AC detection signal 1228 from AC input detector 1224 and DC detection signal 1230 from DC input detector 1226. In some embodiments, upon receiving either AC detection signal 1228 or DC detection signal 1230, controller 1232 is configured to generate motor control signal 1236 that can control the speed or position of motor 1210. For example, if controller 1232 receives AC detection signal 1228, controller 1232 can send motor control signal 1236 to motor 1210 to move drive device 510 to its maximum rotational position.

By contrast, if controller 1232 receives DC detection signal 1230, controller 1232 can utilize the value of DC detection signal 1230 to generate motor control signal 1236 which causes motor 1210 to move drive device 510 into a position based on the value of DC detection signal 1230. For example, DC detection signal 1230 can be a DC voltage. Based on the value of the DC voltage, controller 1232 can determine an appropriate position, which can be proportional to the DC voltage. The position commanded by DC detection signal 1230 can be a minimum rotational position, a maximum rotational position, or an intermediate position between the minimum rotational position and the maximum rotational position. In other embodiments, motor control signal 1236 can be generated by an outside controller supplying an AC or DC voltage signal.

If controller 1232 does not receive AC detection signal 1228 or DC detection signal 1230, controller 1232 can send motor control signal 1236 to motor 1210 which causes motor 1210 to move drive device 510 to the minimum rotational position. If motor 1210 is powered (e.g., by a voltage input received at counterclockwise input 804), motor 1210 can cause drive device 510 to drive to the minimum rotational position (e.g., as is typical in ON/OFF control). However, if motor 1210 is not powered (e.g., no input voltage is received at CCW input 804 or the CW input 802), motor 1210 can stop at its current position (e.g., as is typical in floating point control).

Figure 13:
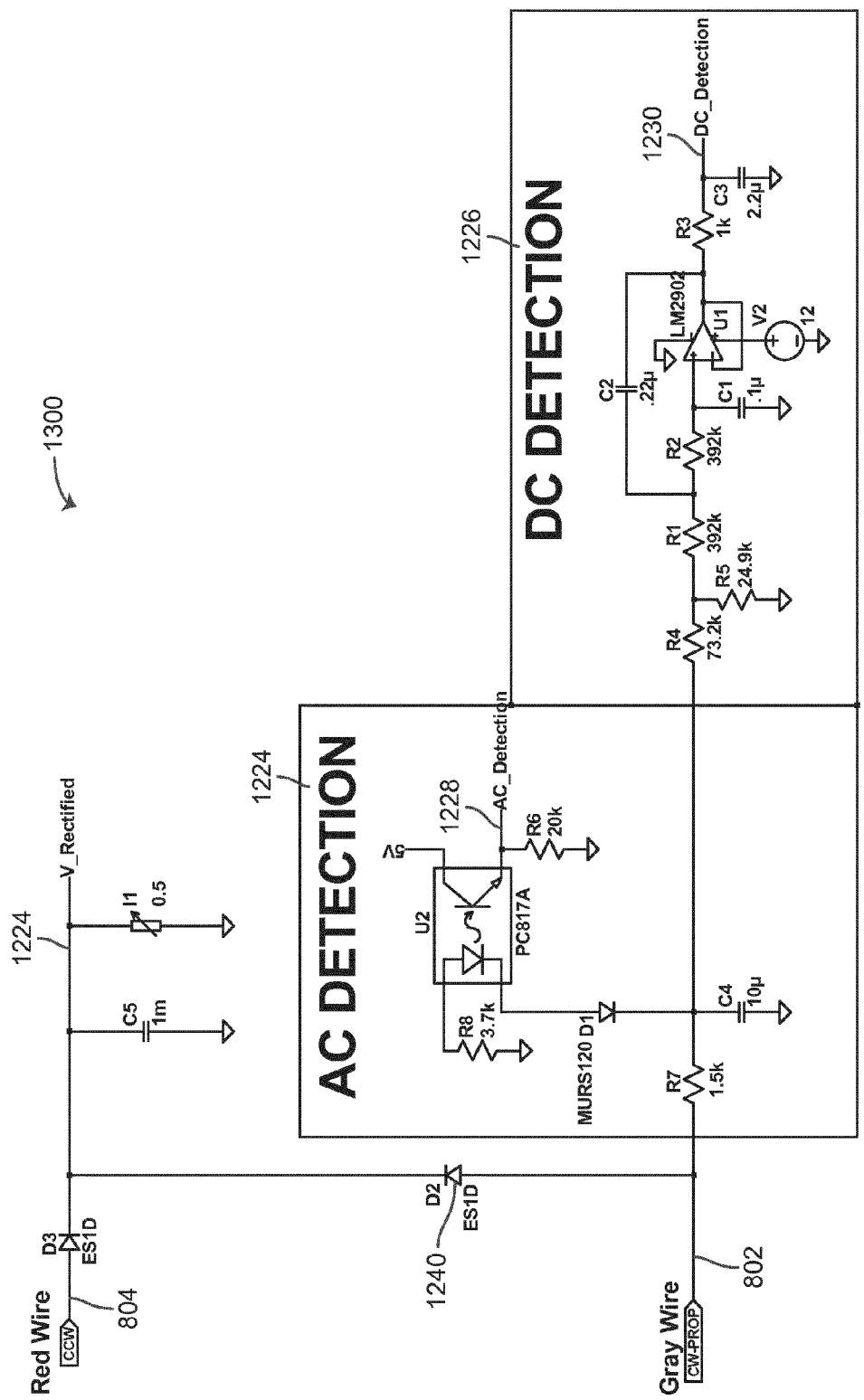
FIG. 13 is a circuit diagram illustrating the universal input detector which can be used in the actuator illustrated in FIG. 5, according to some embodiments.

Referring now to FIG. 13, a circuit diagram 1300 including clockwise input connection 802, counterclockwise input connection 804, AC input detector 1224, and DC input detector 1226 is shown, according to some embodiments. Both AC input detector 1224 and DC input detector 1226 are shown receiving input from the clockwise input connection 802 (shown as "Gray Wire" in FIG. 13). Depending on the status of the clockwise input signal (e.g., AC signal, DC signal, etc.), either AC input detector 1224 generates AC detection signal 1228, or DC input detector 1226 generates DC detection signal 1230.

FIG. 13 additionally depicts both the clockwise input connection 802 and counterclockwise input connection 804 contributing to the rectified voltage ($V_{\_Rectified}$). In some embodiments, the rectified voltage can serve as a source of usable power for motor 1210. Although both clockwise input connection 802 and counterclockwise input connection 804 contribute to the rectified voltage, diode 1240 displaced in the current path between the clockwise input connection and the counterclockwise input connection (shown as diode D2) ensures that only the clockwise input signal is evaluated by AC input detector 1224 and DC input detector 1226. In other words, diode 1240 blocks the CCW input signal from reaching the input detectors but allows both the CW input and the CCW input to contribute to the rectified voltage. The circuit within AC input detector 1224 includes an optocoupler circuit U2, resistors R6, R7, and R8, a diode D1 and a capacitor C4. The circuit within DC input detector 1226 includes an operational amplifier U1, resistors R1, R2, R3, R4, R5, and R8, a voltage source V2, and capacitors C1, C2, and C3. A capacitor C5 and a variable resistor I1 are in parallel between a diode D3 coupled to the Red Wire and ground.

AC input detector 1224 is configured to provide a square wave AC detection signal 1228 in response to an AC signal on input connection 802. In some embodiments, the AC signal has a voltage value that oscillates between an above-ground voltage (e.g., greater than 0 V) and a below-ground voltage (e.g., less than 0 V). When the voltage value of the AC signal is below ground, current flows through optocoupler circuit U2 and diode D1 (down in FIG. 13). The current causes optocoupler circuit U2 to power a transistor within optocoupler circuit U2, which causes a 5 V signal to be provided as the value of AC detection signal 1228. When the voltage value of the AC signal is above-ground, current does not flow through diode D1. The lack of current depowers the transistor within optocoupler circuit U2, which causes a 0 V signal to be provided as the value of AC detection signal 1228. As the voltage value of the AC input signal oscillates between above-ground and below-ground, a square wave AC detection signal 1228 is generated.

AC input detector 1224 is configured to provide a low voltage DC signal (e.g., 0 VDC) in response to a DC signal on input connection 802. In some embodiments, the DC signal has a voltage value that is above-ground voltage. AC input detector 1224 responds to a DC input signal with an above-ground voltage in the same way that the above-ground portion of the AC signal is handled. When an above-ground DC input signal is received at input connection 802, current does not flow through diode D1. The lack of current does not power the transistor within optocoupler circuit U2, which causes a 0 V signal to be provided as the value of AC detection signal 1228. If the DC input signal has a voltage value that is always above-ground, current will not flow through diode D1 and the value of AC detection signal 1228 will be a contestant 0 V.

DC input detector 1226 is configured to provide a DC signal (e.g., 0-2.5 VDC) in response to a DC signal on input connection 802. In some embodiments, the incoming DC signal on input connection 802 has a voltage value that can vary within the range of 0-10 VDC or 0-12 VDC. Resistors R4 and R5 act as voltage dividers to produce a DC voltage within the range 0-2.5 VDC between resistors R4 and R5. The value of the 0-2.5 VDC voltage signal is proportional to the value of the incoming 0-10 VDC or 0-12 VDC input signal. For example, a 10 VDC input signal results in a 2.5 VDC output signal, whereas a 0 VDC input signal results in a 0 VDC output signal. The remaining components of DC input detector 1226 (i.e., R1, R2, R3 C1, C2, C3, and U1) act as a noise filter to reduce noise in the 0-2.5 VDC signal. In some embodiments, the DC detection signal 1230 has a value between 0-2.5 VDC. However, any other range of voltage values can be achieved by varying the size of resistors R4 and R5.

DC input detector 1226 is configured to produce a low voltage signal (e.g., 0 V) in response to an AC signal on input connection 802. In some embodiments, the AC input signal propagates through DC input detector 1226. Resistors R4 and R5 reduce the voltage of the AC input signal in the same way that resistors R4 and R5 reduce the voltage a DC input signal. In some embodiments, the cutoff frequency of the noise filter is low, which allows the reduced-voltage AC signal to propagate through DC input detector 1226, resulting in an oscillating DC detection signal 1230. In other embodiments, the cutoff frequency of the noise filter is high, which filters the high frequency oscillations from the AC signal and produces steady low voltage (e.g., 0 V) DC detection signal 1230. In some embodiments, controller 1232 uses the AC detection signal 1228 as an override signal and ignores the value of DC detection signal 1230 when an AC signal is detected by AC input detector 1224.

Graphs

Referring now to FIGS. 14-17, graphs illustrating the input signal detection performed by actuator 500 are shown, according to some embodiments. FIGS. 14-17 illustrate the behavior of the rectified voltage signal ($V_{RECT}$), the DC detection signal ($V_{DC\_DETECT}$), and the AC detection signal ($V_{AC\_DETECT}$) when different types of clockwise input signals and counterclockwise input signals are provided to actuator 500. The vertical axes of the graphs contained in FIGS. 14-17 represent voltage, with the scales of each graph dependent on the particular voltage signal displayed by the graph. The horizontal axes of the graphs represent time in seconds.

Figure 14:
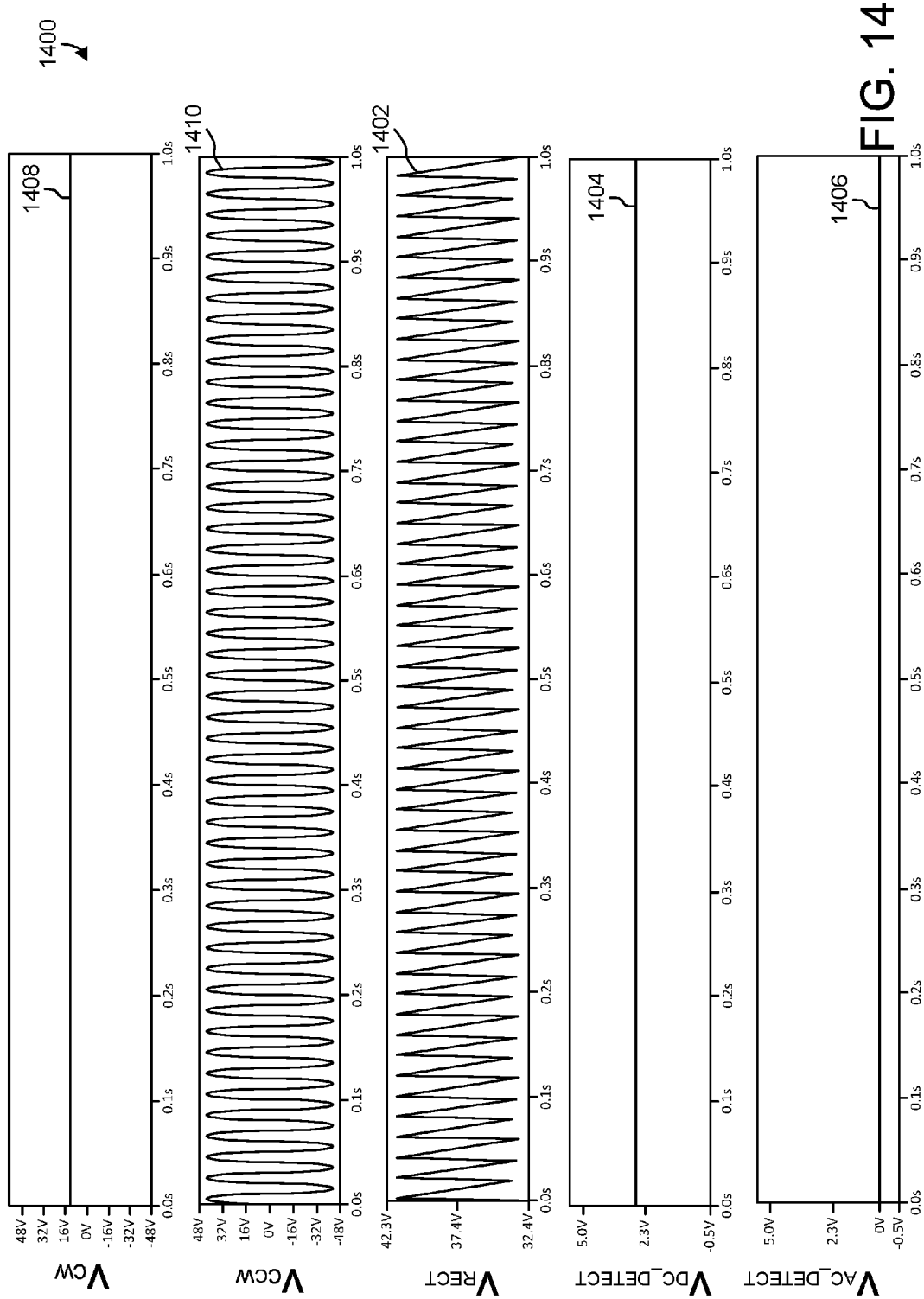
FIGS. 14-17 are graphs illustrating the behaviors of the rectified voltage signal, the DC detection signal, and the AC detection signal when various clockwise input signals and counterclockwise signals are provided to the processing circuit, according to some embodiments.

Referring to FIG. 14, graphs 1400 illustrate the behavior of rectified voltage signal 1402, DC detection signal 1404, and AC detection signal 1406 when processing circuit 1218 receives a nonzero DC voltage signal from clockwise input connection 1408 and a nonzero AC voltage signal from counterclockwise input connection 1410. In response, $V_{RECT}$ 1402 is a nonzero voltage signal in the shape of a triangle wave. $V_{DC\_DETECT}$ 1404 is a steady nonzero voltage signal in response to detecting the DC voltage signal. $V_{AC\_DETECT}$ 1406 is a steady zero voltage signal since no AC voltage is provided to AC input detector 1224. Although an AC voltage signal is provided to counterclockwise input connection 1410, this voltage is blocked from AC input detector 1224 by diode 1240. In this scenario, controller 1232 operates motor 1210 in proportional input mode based on the value of the DC voltage signal, according to some embodiments.

Figure 15:
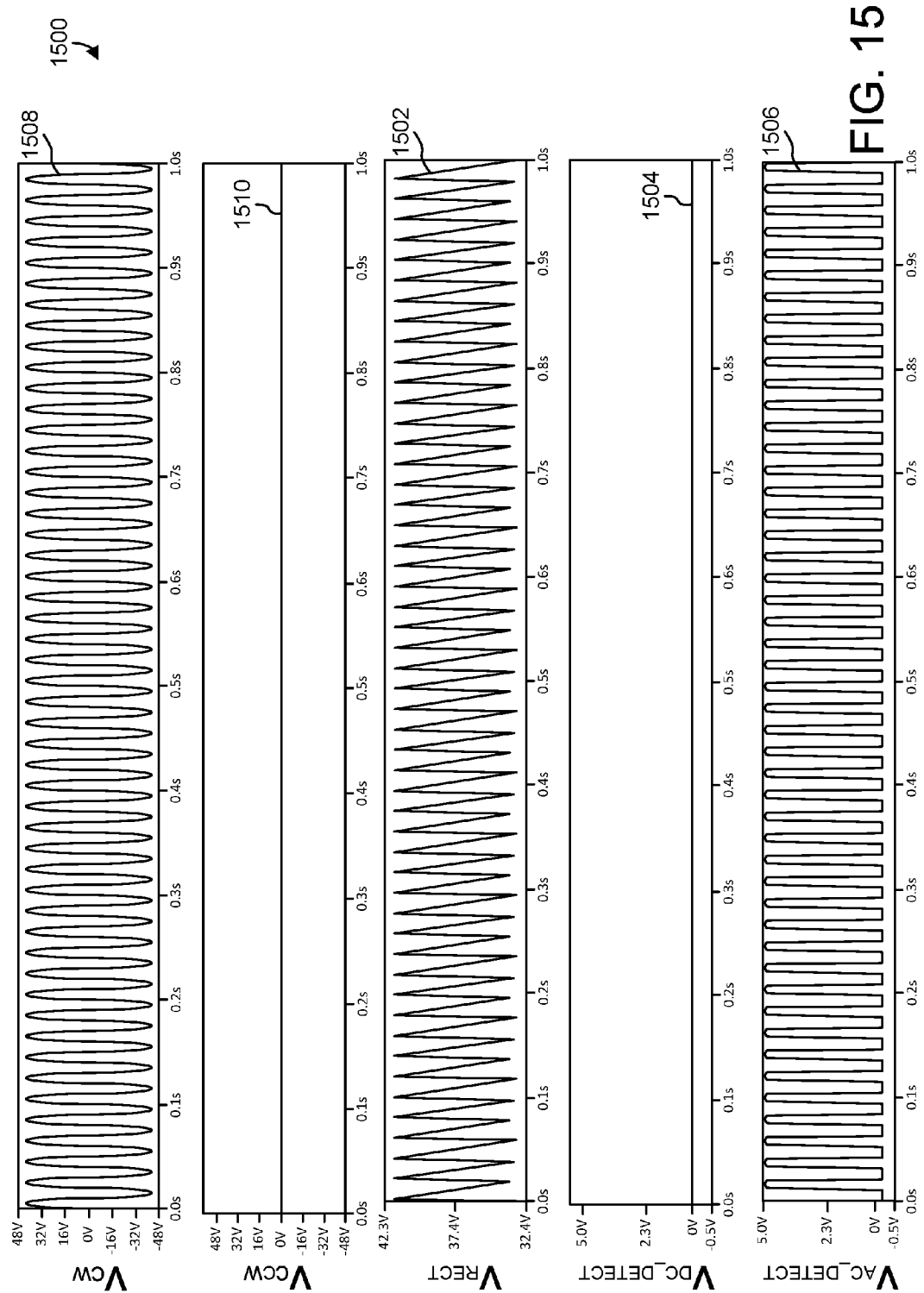

Referring now to FIG. 15, graphs 1500 illustrate the behavior of rectified voltage signal 1502, DC detection signal 1504, and AC detection signal 1506 when processing circuit 1218 receives a nonzero AC voltage signal from clockwise input connection 1508 and a zero AC voltage signal from counterclockwise input connection 1510. In response, $V_{RECT}$ 1502 is a nonzero voltage signal in the shape of a triangle wave. $V_{DC\_DETECT}$ 1504 is a steady zero voltage signal since no DC voltage is provided to DC input detector 1226. $V_{AC\_DETECT}$ 1506 is a nonzero voltage signal in the shape of a square wave in response to detecting the AC voltage signal. In this scenario, controller 1232 provides motor control signal 1236 which drives motor 1210 clockwise toward the clockwise end position in some embodiments. Motor 1210 is powered as indicated by the presence of a non-zero rectified voltage, causing motor 1210 to drive toward the clockwise end position, according to some embodiments.

Figure 16:
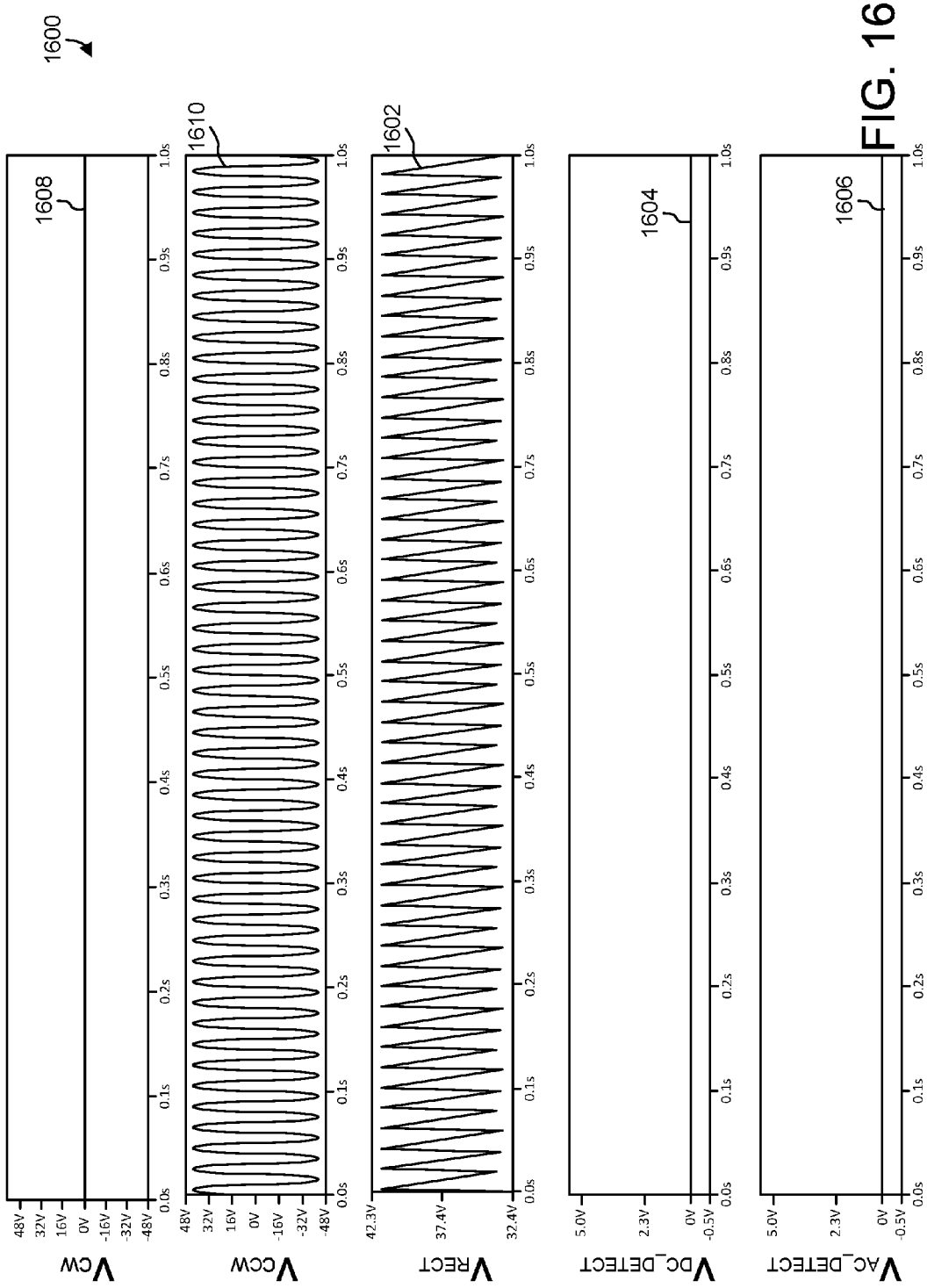

Referring now to FIG. 16, graphs 1600 illustrate the behavior of rectified voltage signal 1602, DC detection signal 1604, and AC detection signal 1606 when processing circuit 1218 receives a zero voltage signal from clockwise input connection 1608 and a nonzero AC voltage signal from counterclockwise input connection 1610. In response, $V_{RECT}$ 1602 is a nonzero voltage signal in the shape of a triangle wave. Both $V_{DC\_DETECT}$ 1604 and $V_{AC\_DETECT}$ 1606 are steady zero voltage signals since neither an AC voltage nor a DC voltage is provided at clockwise input connection 1608. Although an AC voltage signal is provided to the counterclockwise input connection 1610, this voltage is blocked from AC input detector 1224 by diode 1240. In this scenario, controller 1232 provides motor control signal 1236 which drives motor 1210 counterclockwise toward the counterclockwise end position in some embodiments. Motor 1210 is powered as indicated by the presence of a non-zero rectified voltage, causing motor 1210 to drive toward the counterclockwise end position, according to some embodiments.

Figure 17:
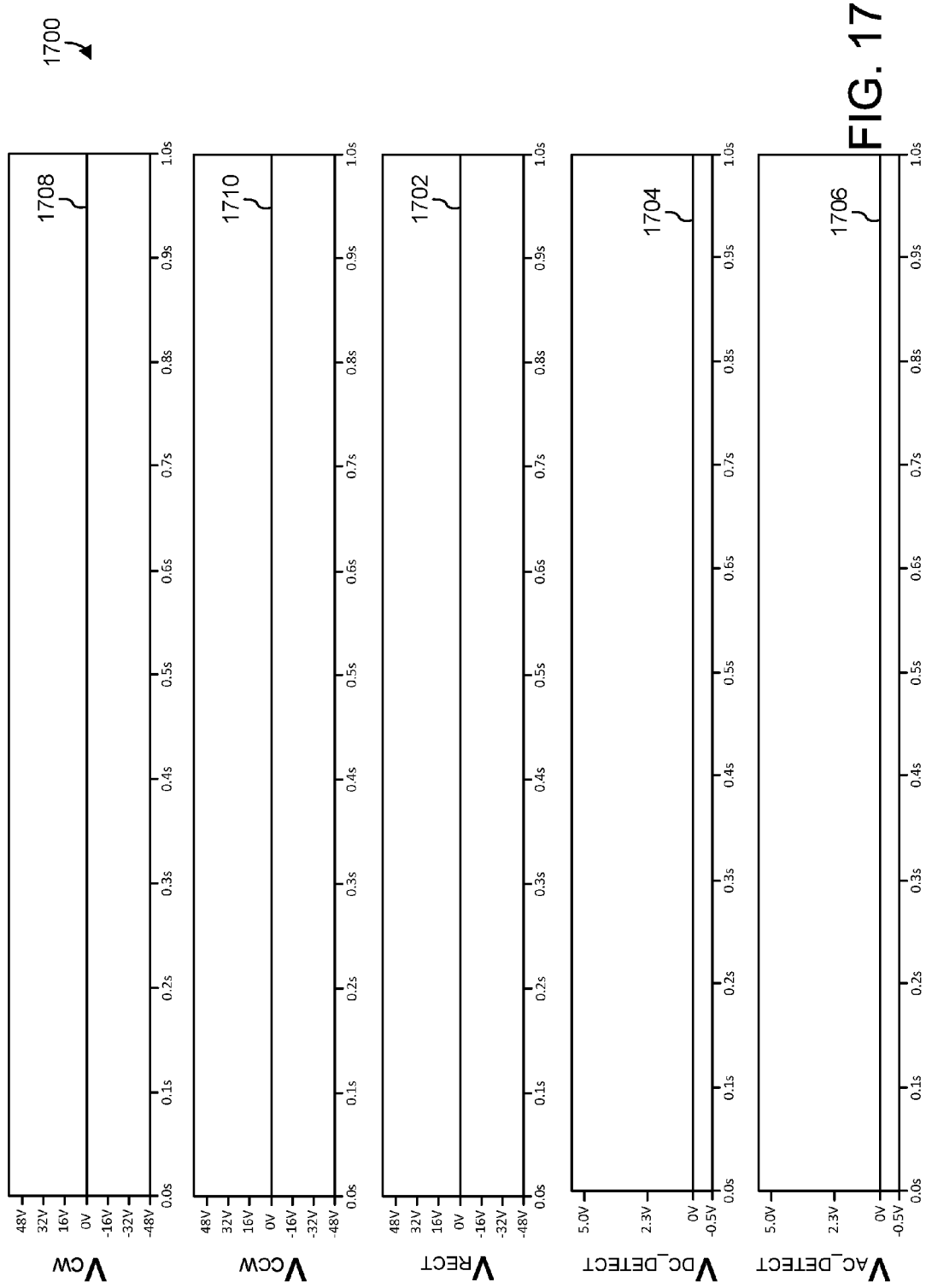

Finally referring to FIG. 17, graphs 1700 illustrate the behavior of rectified voltage signal 1702, DC detection signal 1704, and AC detection signal 1706 when processing circuit 1218 receives zero voltage signals from both clockwise input connection 1708 and counterclockwise input connection 1710. In response, $V_{RECT}$ 1702, $V_{DC\_DETECT}$ 1704, and $V_{AC\_DETECT}$ 1706 all are steady zero voltage signals. In this scenario, controller 1232 does not provide motor control signal 1236, which causes motor 1210 to remain in its current position, according to some embodiments. In some embodiments, controller 1232 provides motor control signal 1236, which drives motor 1210 counterclockwise toward the counterclockwise end position. However, the lack of power to motor 1210 prevents motor 1210 from moving, which results in motor 1210 remaining in its current position, according to some embodiments.

Flow Diagrams

Figure 18:
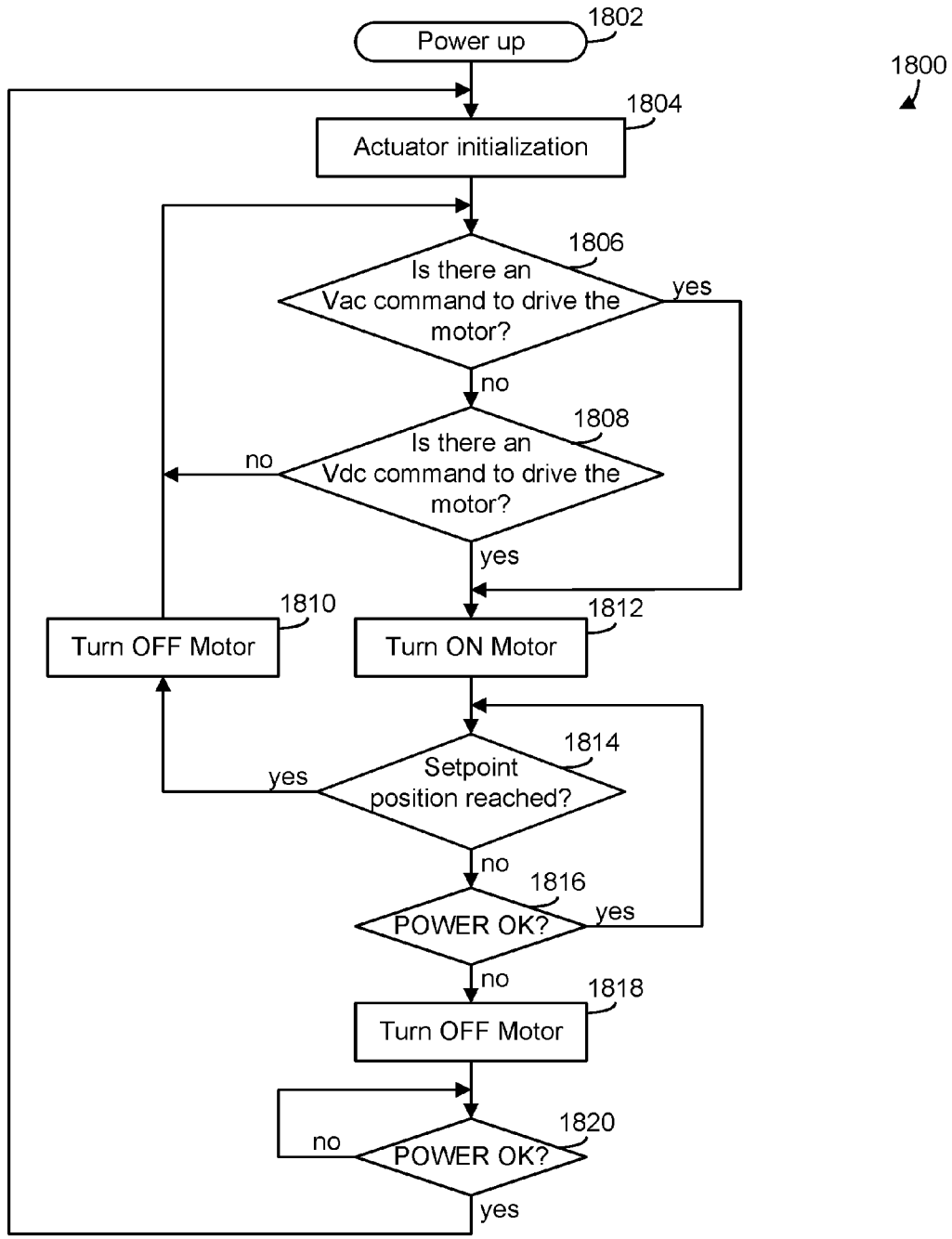
FIG. 18 is a flow diagram of the universal input detection which can be performed by the actuator illustrated in FIG. 5, according to some embodiments.

Referring now to FIG. 18, flow diagram 1800 illustrating the operation of an HVAC actuator is shown, according to some embodiments. In some embodiments, the HVAC actuator is the same or similar to actuator 500, as described with reference to FIGS. 5-13. The actuator 500 can be a damper actuator, a valve actuator, a fan actuator, a pump actuator, or any other type of actuator that can be used in a HVAC system or BMS. The actuator can be a linear actuator (e.g., a linear proportional actuator), a non-linear actuator, a spring return actuator, or a non-spring return actuator. The actuator can be controlled by a processing circuit of the HVAC actuator to control a motor of the actuator. The actuator can be controlled automatically by one or more components of the processing circuit, as described with reference to FIGS. 5-13.

Flow diagram 1800 is shown to include powering up the actuator in step 1802, initializing the actuator in step 1804, and determining whether a signal to drive the actuator is received. Flow diagram 1800 is shown to include determining whether a VAC control signal has been received from controller 1232 in step 1806. If a VAC control signal has been received, controller 1232 can proceed to step 1812 and turn on motor 1210. If a VAC control signal has not been received, flow diagram 1800 is shown to include determining whether a VDC control signal has been received from controller 1232 in step 1808. If a VDC control signal has been received, controller 1232 can proceed to step 1812 and turn on motor 1210. In various embodiments, the signal to drive the actuator can be received as a control signal from a controller, a user device, or any other external system or device.

Flow diagram 1800 is shown to include turning on motor 1210 in step 1812 once a VAC or VDC control signal has been received from controller 1232. Motor 1210 can be coupled to a drive device, which can be connected to a movable HVAC component. In some embodiments, the drive device is the same or similar to drive device 510, as described with reference to FIGS. 5-13. The drive device can be configured to receive a shaft of a damper, a valve, or any other movable HVAC system component in order to drive (e.g., rotate) the shaft. Turning on motor 1210 can cause a corresponding movement of the drive device, which causes the HVAC component to move.

Still referring to FIG. 18, flow diagram 1800 is shown to include determining whether the specified position has been reached in step 1814. The specified position can be included in the command or control signal previously received (e.g., as the DC voltage value of a DC input signal). In some embodiments, determining whether the specified position has been reached includes determining the position of drive device 510. The position of drive device 510 can be determined using position signals from one or more position sensors. The position sensors can be Hall effect sensors, potentiometers, optical sensors, or any other type of sensor configured to measure a position of the motor, the drive device, and/or the HVAC component connected to the drive device. The position of drive device 510 can be determined in terms of Hall sensor counts, motor revolutions, motor position, drive device position, or any other unit that can be used to quantify the position of the motor, the drive device, and/or the HVAC component. For example, the position of drive device 510 can be determined as a number of degrees of rotation of the drive device relative to a fixed position (e.g., a zero location, a mechanical end stop, etc.), a number of revolutions of the motor, a number of Hall sensor counts, etc.

The position of drive device 510 can be compared to the specified position to determine whether the specified position has been reached in step 1814. If the specified position has been reached, motor 1210 can be turned off. However, if the specified position has not been reached, controller 1232 can proceed to determining whether actuator 500 is receiving sufficient power to operate motor 1210 in step 1816. If actuator 500 is receiving sufficient power, controller 1232 can repeat step 1814 in determining whether the position of drive device 510 has reached the specified position until the specified position is reached. If actuator 500 is not receiving sufficient power to drive motor 1210, motor 1210 can be turned off in step 1818. After motor 1210 has been turned off, flow diagram 1800 is shown to include returning to step 1820 in determining whether actuator 500 is receiving sufficient power. Once sufficient power has been received, flow diagram 1800 can return to initializing actuator 500 in step 1804.

Tables

Referring now to FIG. 19, a table 1900 depicting the expected actuator operation when processing circuit 1218 does not contain an AC input detector and a DC input detector, according to various embodiments. Table 1900 represents the state of the prior art, in which a user must manually select a mode based on the actuator input wiring configuration. Accordingly, the first four rows of column 1902 depict the expected actuator operation when the user selects a proportional input mode (denoted in the table by "PROP"), and the next four rows of column 1902 depict the expected actuator operation when the user selects a floating input mode (denoted in the table by "FLT").

The table depicts the impact of the user's mode selection when a DC voltage in the range of 0-20 VDC is supplied to clockwise input 802. When the user has selected the proportional input mode, actuator 500 drives to an end position or an intermediate position between the minimal and the maximal rotation positions corresponding with the value of the DC voltage signal. For example, a DC voltage input of 0 V to clockwise input 802 can cause actuator 500 to drive to a first end position, a DC voltage input of 20 V to clockwise input 802 can cause actuator 500 to drive to the opposite end position, and a DC voltage input of 10 V to clockwise input 802 can cause actuator 500 to drive to an intermediate position. However, if the user has selected the floating input mode and a DC voltage in the range of 0-20 VDC is supplied to clockwise input 802, actuator 500 remains at its current setpoint rather than moving to the position indicated by the DC voltage signal. This behavior may not be desirable.

Referring now to FIG. 20, a table 2000 depicting the expected actuator operation when processing circuit 1218 does contain an AC input detector and a DC input detector, according to some embodiments. Because the presence of AC input detector 1224 and DC input detector 1226 negate the need for the user to select a proportional input mode or a floating input mode, column 1902 is omitted from the table. Therefore, whenever a DC voltage in the range of 0-20 VDC is supplied to clockwise input 8024, actuator 500 drives to an end position or an intermediate position between the minimal and maximal rotation positions corresponding with the value of the of the DC voltage signal. The presence or absence of an AC input signal to clockwise input 802 causes actuator 500 to drive toward an end position or remain in its current position, as previously described. Advantageously, this behavior allows a user to provide either an AC voltage signal or a DC voltage signal to clockwise input 804. Actuator 500 will operate properly regardless of the type of input signal provided without requiring the user to flip a manual mode selection switch.

Configuration of Example Embodiments

The construction and arrangement of the systems and methods as shown in the some embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator in a HVAC system, the actuator comprising:

a motor;
a drive device driven by the motor and coupled to a movable HVAC component for driving the movable HVAC component between multiple positions;
an input connection configured to receive an input signal, the input connection having an ON/OFF wiring configuration comprising:
a clockwise input connection comprising a clockwise input switch, wherein the clockwise input connection is configured to receive a steady AC or DC voltage when the clockwise input switch is closed and to receive zero voltage when the clockwise input switch is open; and
a counterclockwise input connection configured to receive the steady AC or DC voltage; and
a processing circuit coupled to the motor and configured to:
determine whether the input signal is an AC voltage signal or a DC voltage signal;
operate the motor using an AC motor control technique in response to determining that the input signal is the AC voltage signal; and
operate the motor using a DC motor control technique in response to determining that the input signal is the DC voltage signal.

2. The actuator of claim 1, wherein the processing circuit comprises:
a controller;
an AC voltage detector configured to provide an AC detection signal to the controller in response to determining that the input signal is the AC voltage signal; and
a DC voltage detector configured to provide a DC detection signal to the controller in response to determining that the input signal is the DC voltage signal;
wherein the controller is configured to:
operate the motor using the AC motor control technique in response to receiving the AC detection signal from the AC voltage detector; and
operate the motor using the DC motor control technique in response to receiving the DC detection signal from the DC voltage detector.

3. The actuator of claim 1, wherein the AC motor control technique is an ON/OFF control technique comprising:
operating the motor to drive the drive device to a maximum rotational position in a clockwise direction when the clockwise input switch is closed and the steady AC or DC voltage is received by the clockwise input connection; and
operating the motor to drive the drive device to a minimum rotational position in a counterclockwise direction when the clockwise input switch is open and zero voltage is received by the clockwise input connection.

4. A method for controlling a HVAC actuator that includes a motor and a drive device driven by the motor and coupled to a movable HVAC component, the method comprising:
receiving an input signal at an input connection of the actuator;
determining, by a processing circuit of the actuator, whether the input signal is an AC voltage signal or a DC voltage signal;
operating, by the processing circuit, the motor using an AC motor control technique in response to determining that the input signal is the AC voltage signal; and
operating, by the processing circuit, the motor using a DC motor control technique in response to determining that the input signal is the DC voltage signal;
wherein receiving an input signal at an input connection of the actuator comprises:
receiving a steady AC or DC voltage at a clockwise input connection and zero voltage at a counterclockwise input connection when a switch is toggled to a first position; and
receiving zero voltage at the clockwise input connection at the steady AC or DC voltage at the counterclockwise input connection when the switch is toggled to a second position.

5. The method of claim 4, further comprising:
providing an AC detection signal from an AC voltage detector to a controller in response to determining that the input signal is the AC voltage signal, wherein operating the motor using the AC motor control technique occurs in response to the controller receiving the AC detection signal from the AC voltage detector; and
providing a DC detection signal from a DC voltage detector to the controller in response to determining that the input signal is the DC voltage signal, wherein operating the motor using the DC motor control technique occurs in response to the controller receiving the DC detection signal from the DC voltage detector.

6. The method of claim 4, wherein operating the motor using an AC motor control technique comprises:
operating the motor to drive the drive device to a maximum rotational position in a clockwise direction when the switch is in the first position and the steady AC or DC voltage is provided to the clockwise input connection; and
operating the motor to drive the drive device to a minimum rotational position in a counterclockwise direction when the switch is in the second position and zero voltage is provided to the clockwise input connection.

7. An actuator in a HVAC system, the actuator comprising:
a motor;
a drive device driven by the motor and coupled to a movable HVAC component for driving the movable HVAC component between multiple positions;
an input connection configured to receive an input signal, the input connection having a floating incremental wiring configuration comprising:
a clockwise input connection comprising a clockwise input switch, wherein the clockwise input connection is configured to receive a steady AC or DC voltage when the clockwise input switch is closed and to receive zero voltage when the clockwise input switch is open; and
a counterclockwise input connection comprising a counterclockwise input switch, wherein the counterclockwise input connection is configured to receive a steady AC or DC voltage when the counterclockwise input switch is closed and to receive zero voltage when the counterclockwise input switch is open; and
a processing circuit coupled to the motor and configured to:
determine whether the input signal is an AC voltage signal or a DC voltage signal;
operate the motor using an AC motor control technique in response to determining that the input signal is the AC voltage signal; and
operate the motor using a DC motor control technique in response to determining that the input signal is the DC voltage signal.

8. The actuator of claim 7, wherein the AC motor control signal technique is a floating incremental control technique comprising:
  operating the motor to drive the drive device to a maximum rotational position in a clockwise direction when the clockwise input switch is closed and the steady AC or DC voltage is provided to the clockwise input connection;
  operating the motor to drive the drive device to a minimum rotational position in a counterclockwise direction when the counterclockwise input switch is closed and the clockwise input switch is open such that the steady AC or DC voltage is provided to the counterclockwise input connection and zero voltage is provided to the clockwise input connection; and
  preventing the motor from driving the drive device when the clockwise input switch and the counterclockwise input switch are both open such that zero voltage is provided to both the clockwise input connection and the counterclockwise input connection.

* * * * *